(12) United States Patent
Taherzadeh Boroujeni et al.

(10) Patent No.: US 11,963,028 B2
(45) Date of Patent: Apr. 16, 2024

(54) DYNAMIC AND COMPACT MEASUREMENT REPORT RESOLUTION IN WIRELESS SYSTEMS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Iyab Issam Sakhnini, San Diego, CA (US); Junyi Li, Fairless Hills, PA (US); Jelena Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/302,748

(22) Filed: May 11, 2021

(65) Prior Publication Data
US 2021/0360460 A1 Nov. 18, 2021

Related U.S. Application Data

(60) Provisional application No. 63/025,939, filed on May 15, 2020, provisional application No. 63/025,942, filed on May 15, 2020.

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
CPC .................................................... H04W 24/10
See application file for complete search history.

(56) References Cited

U.S. PATENT DOCUMENTS

| 2018/0219664 A1 | 8/2018 | Guo et al. |
| 2018/0227031 A1 | 8/2018 | Guo et al. |

(Continued)

OTHER PUBLICATIONS

International Search Report and Written Opinion—PCT/US2021/032060—ISA/EPO—dated Aug. 19, 2021.

*Primary Examiner* — Chi H Pham
*Assistant Examiner* — Raul Rivas
(74) *Attorney, Agent, or Firm* — Arent Fox Schiff LLP

(57) ABSTRACT

In one aspect of the disclosure, a UE may be configured to receive, from a base station, information indicating a reference point associated with at least one L1 measurement; determine a reporting value of the at least one L1 measurement based on a difference between the reference point and a measured value of the at least one L1 measurement; and transmit information indicating the reporting value to the base station. In another aspect, a RAN node can indicate to a UE that a reduced measurement report resolution is to be used for beam measurements in a measurement report. The reduced measurement report resolution is less than a first measurement report resolution previously indicated to be used for the beam measurements. Lower resolution can be obtained by using fewer bits to indicate one or more of the beam measurements. The payload for a measurement report such as a L-SINR or L-RSP L1 measurement report is thereby reduced when the UE transmits the measurement report to the RAN node.

23 Claims, 21 Drawing Sheets

(56) References Cited

U.S. PATENT DOCUMENTS

| | | | |
|---|---|---|---|
| 2020/0358513 A1* | 11/2020 | Ku | H04B 7/0632 |
| 2021/0297850 A1 | 9/2021 | Matsumura et al. | |
| 2021/0306060 A1* | 9/2021 | Matsumura | H04B 17/336 |

* cited by examiner

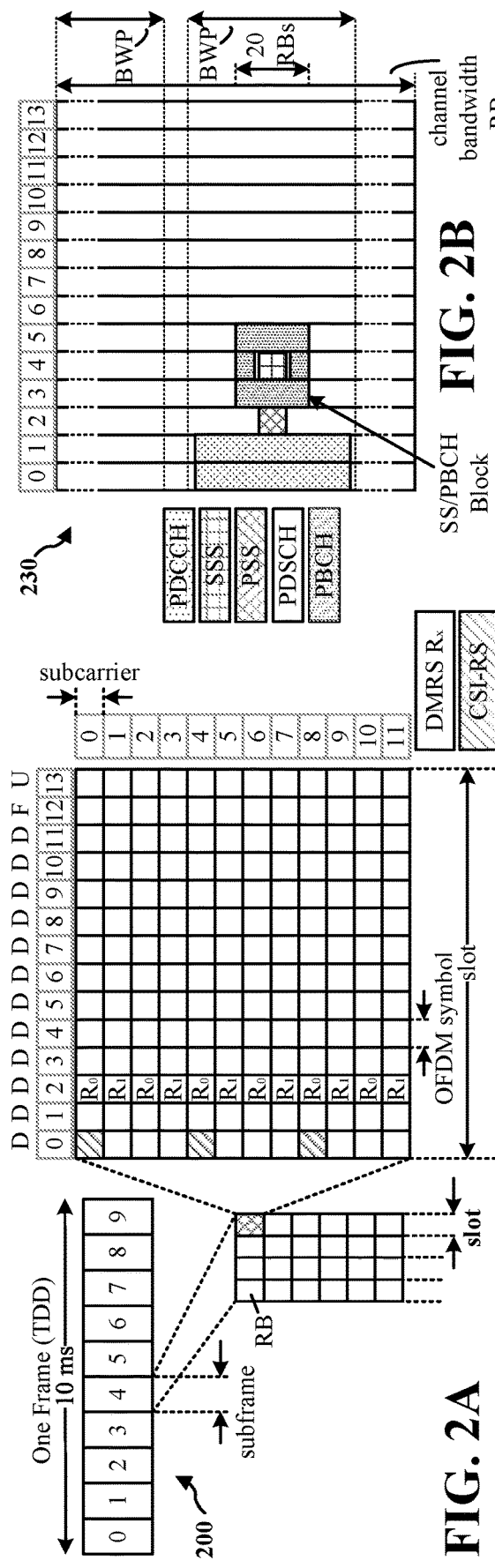
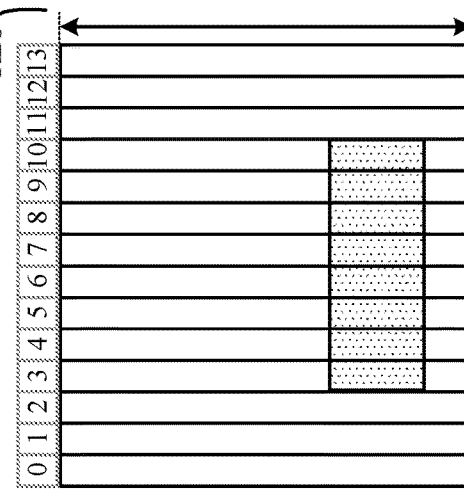
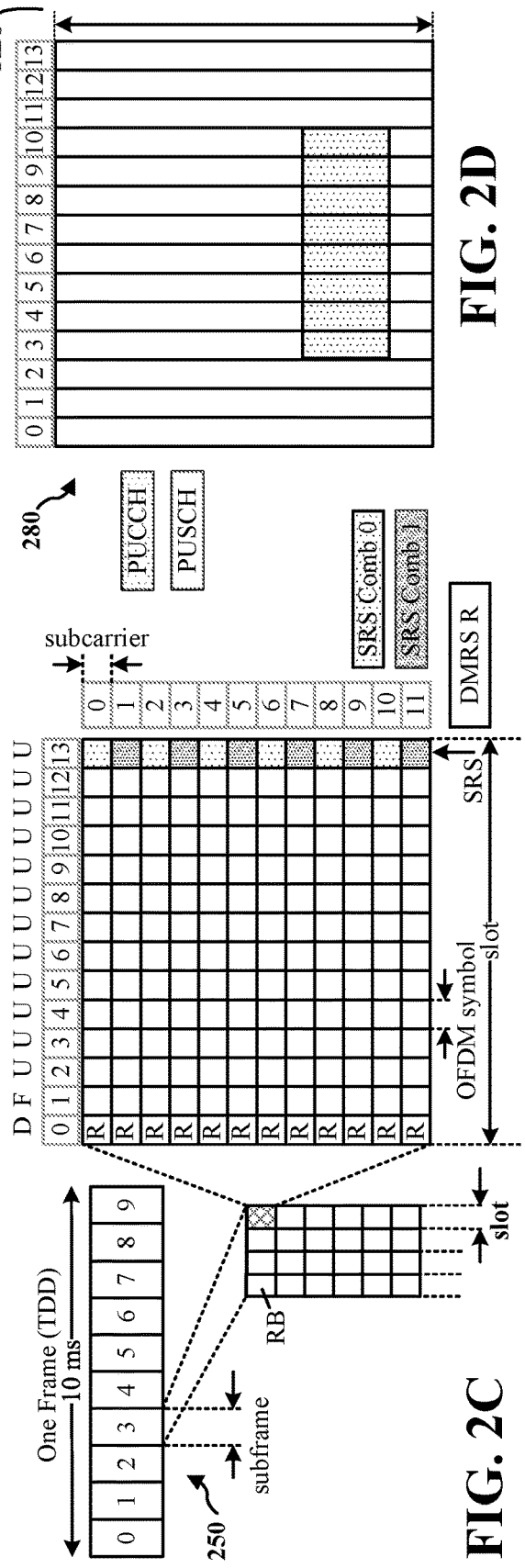
FIG. 2A  FIG. 2B  FIG. 2C  FIG. 2D

| Measurement Report (Reduced Measurement Report Resolution) | | | | | | | | |
|---|---|---|---|---|---|---|---|---|
| Beam 4 (4 bits) | Beam 5 (4 Bits) | Beam 3 (4 Bits) | Beam 6 (4 Bits) | Beam 5 (4 bits) | Beam 4 (4 Bits) | Beam 3 (4 Bits) | Beam 6 (4 Bits) |
| Beam 4 SINR (Best Beam, Absolute) (5 Bits) | Beam 5 SINR (Diff) (2 Bits) | Beam 3 SINR (Diff) (2 Bits) | Beam 6 SINR (Diff) (2 Bits) | Beam 5 RSRP (Best Beam, Absolute) (6 Bits) | Beam 4 RSRP (Diff) (3 Bits) | Beam 3 RSRP (Diff) (3 Bits) | Beam 6 RSRP (Diff) (3 Bits) |

FIG. 17

DYNAMIC AND COMPACT MEASUREMENT REPORT RESOLUTION IN WIRELESS SYSTEMS

CROSS-REFERENCE TO RELATED APPLICATIONS

This application claims the benefit of U.S. Provisional Application Ser. No. 63/025,942, filed May 15, 2020 and entitled "Dynamic Change Of Measurement Report Resolution", and U.S. Provisional Application Ser. No. 63/025,939, filed May 15, 2020 and entitled "Compact Layer 1 Report Using Reference Point", both of which are expressly incorporated by reference herein.

Technical Field

The present disclosure relates generally to wireless communication, and more particularly, to layer 1 measurement reporting for beam-based communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In various radio access networks (RANs), channel state information (CSI) reports are used for beam management between base stations and user equipment (UE). In particular, CSI reporting is important for beam reliability, which is used for unicast coverage in Frequency Regime 2 (FR2). A CSI report may include multiple different fields, for example, including a channel quality indicator (CQI), precoding matrix indicator (PMI), CSI reference signal (RS) resource indicator (CRI), a strongest layer indication (SLI), and/or a rank indication.

CSI reporting may be periodic, semi-persistent, and/or aperiodic. For example, periodic and semi-persistent CSI reporting may support the periodicities of 5, 10, 20, 40, 80, 160, and/or 320 slots. CSI reporting may occur on an uplink control channel and/or an uplink data channel. For example, periodic CSI reporting may be carried on a short physical uplink control channel (PUCCH) or a long PUCCH. Semi-persistent CSI reporting may be carried on a long PUCCH or a PUSCH, and resources and the modulation and coding scheme (MCS) for semi-persistent CSI reporting on the PUSCH may be allocated semi-persistently via downlink control information (DCI). Further, semi-persistent CSI reporting may support Type II with a minimum periodicity of 5 milliseconds (ms). However, semi-persistent CSI reporting may not be supported for aperiodic CSI-RS (although this may not preclude one CSI reporting being carried by multiple uplink reporting instances). A periodic CSI reporting may be carried on PUSCH multiplexed with or without uplink data.

In some aspects, a CSI report may include a layer 1 (L1) reference signal receive power (RSRP) and/or L1 signal-to-interference-plus-noise ratio (SINR). The L1-RSRP and/or L1-SINR may be used for beam management. For example, L1-SINR may be used for beam selection considering interference (and L1-RSRP may have a similar format). Such L1 measurements may be relatively large (e.g., approximately 20 bits), which may cause poor coverage when carried on the PUCCH. Thus, a need exists for improving the coverage of CSI reporting that includes L1 reporting, for example, during transient periods in which the current beam becomes weak and until a new beam is selected.

The present also disclosure provides various techniques and solutions for improving the reliability of L1 reporting. In particular, the present disclosure provides for efficient CSI reporting during transient periods by using a compact L1 report. The compact L1 report may use fewer bits to convey L1 measurements from a UE to a base station.

In another aspect of the disclosure, a method, a computer-readable medium, and an apparatus are provided. The apparatus may be a UE configured to receive, from a base station, information indicating a reference point associated with at least one L1 measurement; determine a reporting value of the at least one L1 measurement based on a difference between the reference point and a measured value of the at least one L1 measurement; and transmit information indicating the reporting value to the base station.

In another aspect of the disclosure, a method, a computer-readable medium, and an apparatus are provided. The apparatus may be a base station configured to determine a reference point associated with at least one L1 measurement; transmit, to a UE, information indicating the reference point; receive, from the UE, information indicating a reporting value of the at least one L1 measurement, the reporting value being based on a difference between the reference point and a measured value of the at least one L1 measurement.

One aspect of the subject matter described in this disclosure can be implemented in a method for wireless communication at a user equipment (UE). The method includes receiving, from a radio access network (RAN) entity, an indication that indicates a reduced measurement report resolution for beam measurements in a measurement report, the reduced measurement report resolution being less than a first measurement report resolution previously indicated to be used for the beam measurements. The method may also include receiving a plurality of beams, performing measurements on the plurality of beams, and transmitting the measurement report to the RAN entity based on the beam measurements using the reduced measurement report resolution.

Another aspect of the subject matter described in this disclosure can be implemented in a user equipment (UE). The UE includes a wireless transceiver, a memory, and a processor communicatively coupled to the wireless transceiver and the memory. The processor is configured to receive, from a radio access network (RAN) entity, an indication to use a reduced measurement report resolution for beam measurements in a measurement report, the reduced measurement report resolution being less than a first measurement report resolution previously indicated to be used for the beam measurements. The processor is also configured to receive a plurality of beams, perform measurements on the plurality of beams, and transmit the measurement report to the RAN entity based on the beam measurements using the reduced measurement report resolution.

Another aspect of the subject matter described in this disclosure can be implemented in a user equipment (UE). The UE includes a means for receiving, from a radio access network (RAN), an indication to use a reduced measurement report resolution for beam measurements in a means for reporting the beam measurements. The UE also includes a means for transmitting the means for reporting the beam measurements using the reduced measurement report resolution.

Another aspect of the subject matter described in this disclosure can be implemented in non-transitory computer-readable medium storing computer-executable code, comprising code for causing a user equipment (UE) to receive, from a radio access network (RAN) entity, an indication to use a reduced measurement report resolution for beam measurements in a measurement report, the reduced measurement report resolution being less than a first measurement report resolution previously indicated to be used for the beam measurements. The code can also cause the UE to receive a plurality of beams, perform measurements on the plurality of beams, and transmit the measurement report to the RAN entity based on the beam measurements using the reduced measurement report resolution.

In some implementations of the methods and devices, the method can include receiving a report setting from the RAN entity before receiving the indication, the report setting indicating the first measurement report resolution and contents to be included in the measurement report. As such, the devices can be configured to receive a report setting from the RAN entity before receiving the indication, the report setting indicating the first measurement report resolution and contents to be included in the measurement report.

In some implementations of the methods and devices, the beam measurements include a reference signal received power (RSRP) measurement or a signal to interference plus noise ratio (SINR) measurement. In some implementations of the methods and devices, the plurality of beams includes a first beam, a second beam, a third beam and a fourth beam, the first measurement report resolution having seven bits to report one or more measurements for the first beam, four bits to report one or more measurements for the second beam, four bits to report one or more measurements for the third beam, and four bits to report one or more measurements for the fourth beam.

In some implementations of the methods and devices, the indication indicates a quantization level of the beam measurements associated with the reduced measurement report resolution. In some implementations of the methods and devices, the indication is received in a media access control (MAC) control element (CE), user equipment (UE) specific downlink control information (DCI), or group common DCI.

In some implementations of the methods and devices, the indication indicates that each of one or more measurements of the beam measurements is to be reduced by a specific number of bits. In some implementations of the methods and devices, the indication indicates a reduction in a number of bits to be used for a first beam measurement of the beam measurements, the method further comprising reducing the number of bits for each of one or more other measurements of the beam measurements based on the reduction in the number of bits to be used for the first beam measurement.

In some implementations of the methods and devices, the beam measurements include an absolute beam measurement of a first beam of the plurality of beams and a differential beam measurement of a second beam of the plurality of beams that is relative to the absolute beam measurement of the first beam. In some implementations of the methods and devices, the measurement report is a physical layer measurement report.

In some implementations of the methods and devices, the method includes receiving, from the RAN entity, a second indication to resume using the first measurement report resolution for the beam measurements in a subsequent measurement report. In some implementations of the methods and devices, the devices are configured to receive, from the RAN entity, a second indication to resume using the first measurement report resolution for the beam measurements in a subsequent measurement report.

In some implementations of the methods and devices, the method includes receiving, from the RAN entity, a second indication to further reduce the reduced measurement report resolution for the beam measurements in a subsequent measurement report. In some implementations of the methods and devices, the devices are configured to receive, from the RAN entity, a second indication to further reduce the reduced measurement report resolution for the beam measurements in a subsequent measurement report.

One aspect of the subject matter described in this disclosure can be implemented in a method for wireless communication at a radio access network (RAN) node. The method includes transmitting, to a user equipment (UE), an indication to use a reduced measurement report resolution for beam measurements in a measurement report, the reduced measurement report resolution being less than a first measurement report resolution previously indicated to be used for the beam measurements. The method also includes transmitting a plurality of beams, and receiving the measurement report from the UE based on the beam measurements using the reduced measurement report resolution.

Another aspect of the subject matter described in this disclosure can be implemented in a radio access network (RAN) node. The RAN node includes a wireless transceiver, a memory, and a processor communicatively coupled to the wireless transceiver and the memory. The processor is configured to transmit, to a user equipment (UE), an indication to use a reduced measurement report resolution for beam measurements in a measurement report, the reduced measurement report resolution being less than a first measurement report resolution previously indicated to be used for the beam measurements. The processor is also configured to transmit a plurality of beams, and receive the measurement report from the UE based on the beam measurements using the reduced measurement report resolution.

Another aspect of the subject matter described in this disclosure can be implemented a radio access network (RAN) node. The RAN node includes a means for transmitting, to a user equipment (UE), an indication to use a reduced measurement report resolution for beam measurements in a means for reporting the beam measurements. The RAN node also includes a means for transmitting a plurality of beams, and a means for receiving the means for reporting the beam measurements using the reduced measurement report resolution.

Another aspect of the subject matter described in this disclosure can be implemented in non-transitory computer-readable medium storing computer-executable code, comprising code for causing a radio access network (RAN) node to transmit, to a user equipment (UE), an indication to use a reduced measurement report resolution for beam measurements in a measurement report, the reduced measurement report resolution being less than a first measurement report resolution previously indicated to be used for the beam measurements. The code also causes the RAN node to transmit a plurality of beams, and receive the measurement report from the UE based on the beam measurements using the reduced measurement report resolution.

In some implementations of the methods and devices, the method includes transmitting a report setting from the RAN entity before transmitting the indication, the report setting indicating the first measurement report resolution and contents to be included in the measurement report. In some implementations of the methods and devices, the devices are configured to transmit a report setting from the RAN entity before transmitting the indication, the report setting indicating the first measurement report resolution and contents to be included in the measurement report.

In some implementations of the methods and devices, the indication indicates a quantization level of the beam measurements associated with the reduced measurement report resolution. In some implementations of the methods and devices, the indication indicates that each of one or more measurements of the beam measurements is to be reduced by a specific number of bits.

In some implementations of the methods and devices the indication indicates a reduction in a number of bits for a first beam measurement of the beam measurements, the method further comprising reducing the number of bits for each of one or more other measurements of the beam measurements based on the reduction in the number of bits to be used for the first beam measurement.

In some implementations of the methods and devices, one of the beam measurements includes an absolute beam measurement of a first beam of the plurality of beams and a differential beam measurement of a second beam of the plurality of beams that is relative to the absolute beam measurement of the first beam.

In some implementations of the methods and devices, the method includes transmitting, to the UE, a second indication to resume using the first measurement report resolution for the beam measurements in a subsequent measurement report. In some implementations of the methods and devices, the devices are configured to transmit, to the UE, a second indication to resume using the first measurement report resolution for the beam measurements in a subsequent measurement report.

In some implementations of the methods and devices, the method includes transmitting, to the UE, a second indication to further reduce the reduced measurement report resolution for the beam measurements in a subsequent measurement report. In some implementations of the methods and devices, the devices are configured to transmit, to the UE, a second indication to further reduce the reduced measurement report resolution for the beam measurements in a subsequent measurement report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 17 is a diagram illustrating another example of a measurement report according to some aspects.

DETAILED DESCRIPTION

Figure 1:
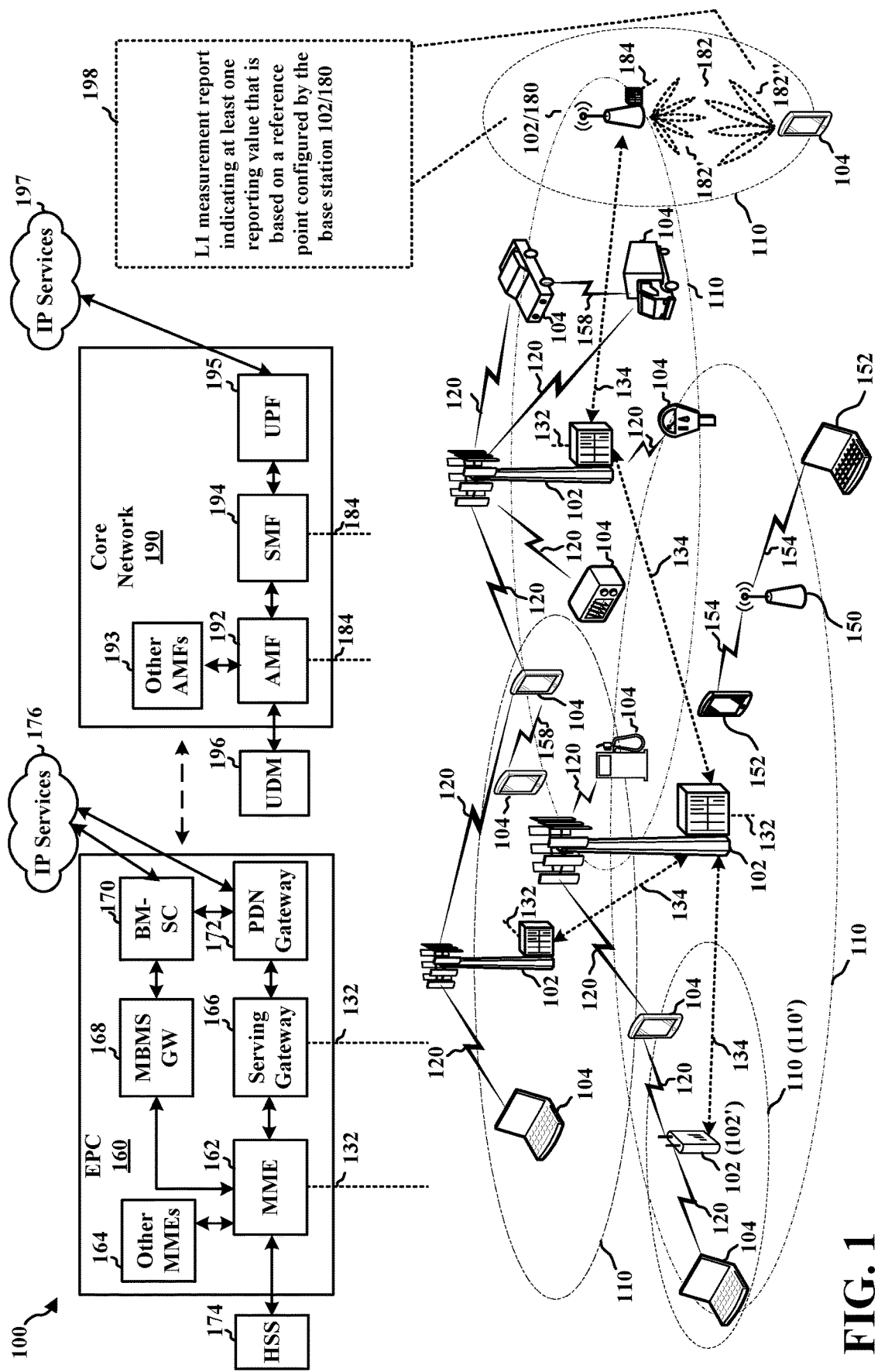
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example configurations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Wireless communication networks are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless communication network may include numerous network nodes including a core network, base stations in communication with the core network, and user equipment (UEs)) served by the base stations. Each base station and UE may be equipped with multiple antennas, which may be used to employ techniques such as transmit diversity, multiple-input multiple-output (MIMO), or beamforming. Beamforming is a technique to form unicast beams between network nodes (for example, between a base station and a UE, between a base station and another base station, or between a UE and another UE) that may improve the performance of a wireless communication link between the two network nodes. Beamforming more specifically refers to signal processing techniques that may be used at a transmitting device or a receiving device to shape or steer a beam of energy along a spatial path between the transmitting device and the receiving device. Beamforming may be achieved by combining or adjusting the signals transmitted via the antenna elements of an multi-antenna array such that signals propagating at different orientations or directions with respect to an antenna array experience constructive interference while others experience destructive interference.

The adjustment of the signals transmitted via the respective antenna elements may include the application of amplitude and phase offsets to the signals to generate the beam. The amplitude and phase offsets may be determined through performing measurements on reference signals and estimating a channel based on the measurements. For example, to select one or more beams for communication between a base station and a UE, the base station may transmit a reference signal, such as a synchronization signal block (SSB) or a channel state information (CSI) reference signal (CSI-RS), on a plurality of beams in a beam sweeping manner. The UE can perform one or more measurements on the received beams and return a Layer 1 (L1) measurement report including the beam measurements obtained for one or more of the measured beams. For example, the beam measurements may include a reference signal received power (RSRP) or signal-to-interference-plus-noise ratio (SINR).

Aspects of the present disclosure generally relate to reducing the size of measurement reports, particularly Layer 1 (L1) measurement reports reporting beam measurements such as reference signal received power (RSRP) or signal-to-interference-plus-noise ratio (SINR). In many scenarios, such as weak coverage or critical coverage scenarios, reliability may be more important than resolution. In such scenarios, radio resource control (RRC) signaling can indicate to a user equipment (UE) that a measurement report is to be transmitted with reduced resolution. The configurations of the measurement reports, often called report settings, can indicate the number of bits with which to report the beam measurements and the resource indicators. The RRC signaling can indicate that the reported beam measurements in measurement reports associated with a specific report setting are to have less resolution. For example, a radio access network (RAN) node can indicate to a UE to reduce the length or size of the reported beam measurements in L1-SINR measurement reports by two bits. For example, an L1-SINR measurement report can report four beam measurements with seven bits used for first beam and four bits used for the rest of the beams, a total of 19 bits. A reduced resolution L1-SINR measurement report can report the four beam measurements with five bits used for first beam and two bits used for the rest of the beams, a total of 11 bits and a 42% reduction from 19 bits. At a later time, when reduced resolution reports are no longer desired, RRC signaling can indicate to the UE that reduced resolution measurement reports should no longer be sent.

Particular aspects of the subject matter described in this disclosure can be implemented to one or more of the following potential advantages. In some aspects, the disclosed techniques can be used to reduce the size of a measurement report by reducing the size of the measurement report's payload. More measurement reports can be reliably sent when the size of measurement reports is reduced. In some aspects, smaller payloads in beam measurement reports result in more reliable delivery where coverage is weak and where coverage is critical.

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, it should be understood that the term "sub-6 GHz" if used herein by way of example may represent all or part of FR1 for 5G NR. Further, unless specifically stated otherwise, it should be understood that the term "millimeter wave" as used herein by way of example may represent all or part of FR2 for 5G NR and/or all or part of a 30 GHz-300 GHz waveband. It should also be understood that the terms "sub-6 GHz" and "millimeter wave," are intended to represent modifications to such example frequency bands that may occur due to author/entity decisions regarding wireless communications, e.g., as presented by example herein.

It should be understood that the above examples are not necessarily intended to limit claimed subject matter. For example, unless specifically recited, claimed subject matter relating to wireless communications is not necessarily intended to be limited to any particular author/entity defined frequency band, or the like.

Further, while aspects and configurations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, configurations and/or uses may come about via integrated chip configurations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described configurations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the base station 102/180 may be configured to determine a reference point associated with at least one layer 1 (L1) measurement. The base station 102/180 may transmit, to the UE 104, information indicating the reference point. The base station 102/180 may then receive, from the UE 104, information indicating a reporting value of the at least one L1 measurement, the reporting value being based on a difference between the reference point and a measured value of the at least one L1 measurement—that is, the base station 102/180 may receive, from the UE 104, an L1 measurement reporting indicating at least one reporting value that is based on a reference point (198).

Correspondingly, the UE 104 may be configured to receive, from the base station 102/180, information indicating a reference point associated with at least one L1 measurement. The UE 104 may determine a reporting value of the at least one L1 measurement based on a difference between the reference point and a measured value of the at least one L1 measurement. The UE 104 may then transmit information indicating the reporting value to the base station 102/180. That is, the UE 104 may transmit an L1 measurement reporting indicating at least one reporting value that is based on a reference point configured by the base station 102/180 (198).

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
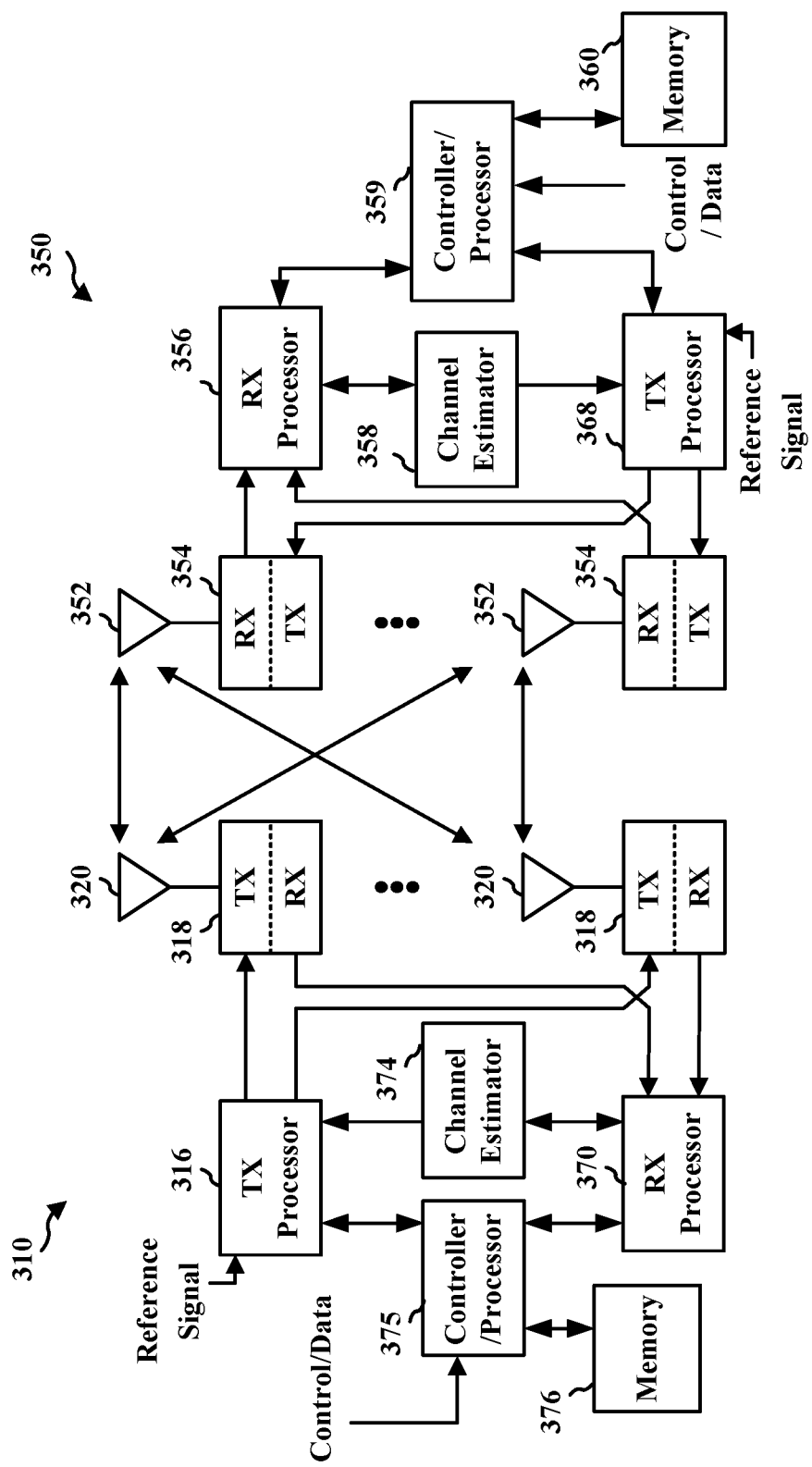
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with (198) of FIG. 1.

In some other aspects, at least one of the TX processor 316, the RX processor 370, and the controller/processor 375 may be configured to perform aspects in connection with 198 of FIG. 1.

Figure 4:
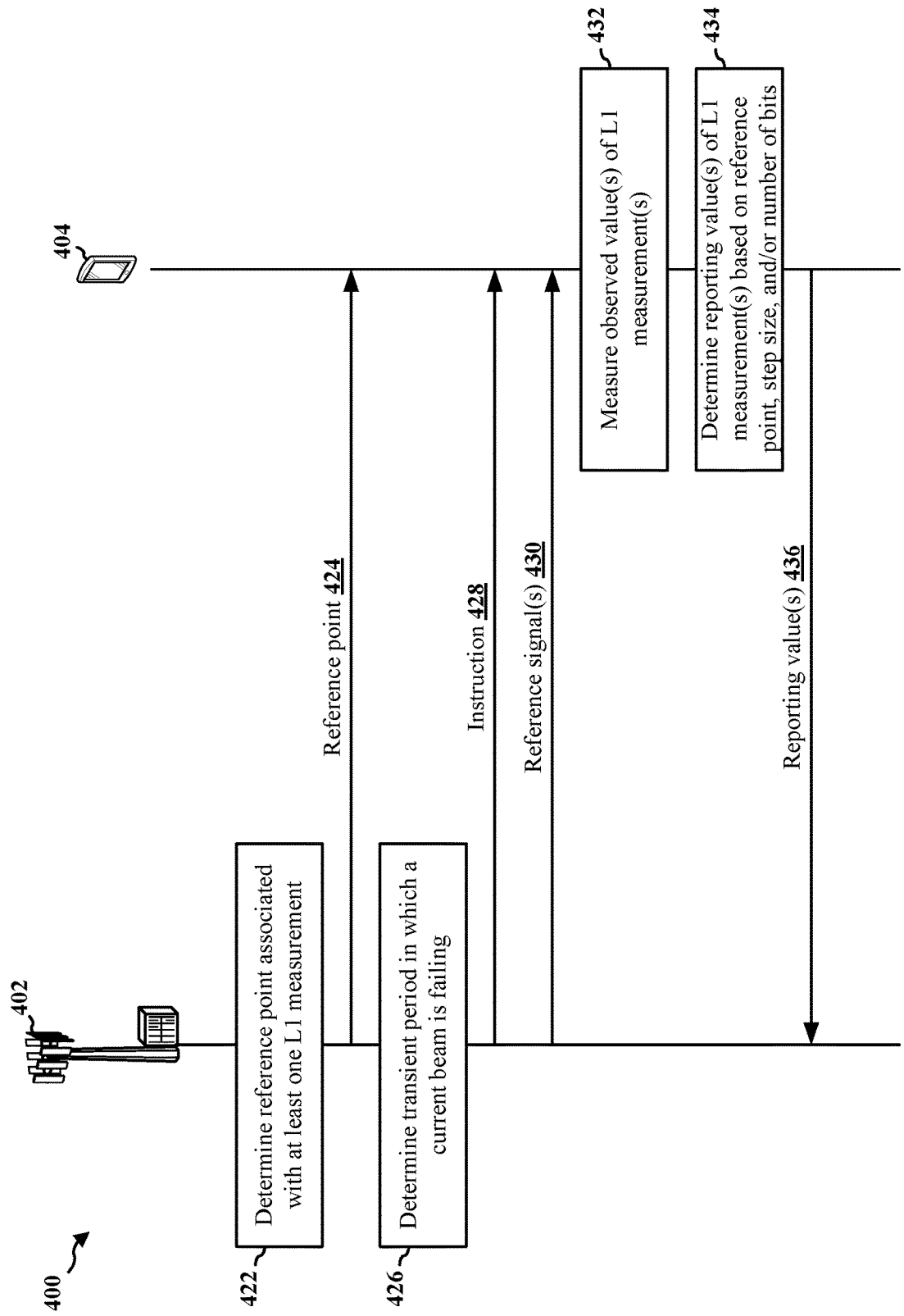
FIG. 4 is a call flow diagram illustrating operations in an access network.
Figure 5:
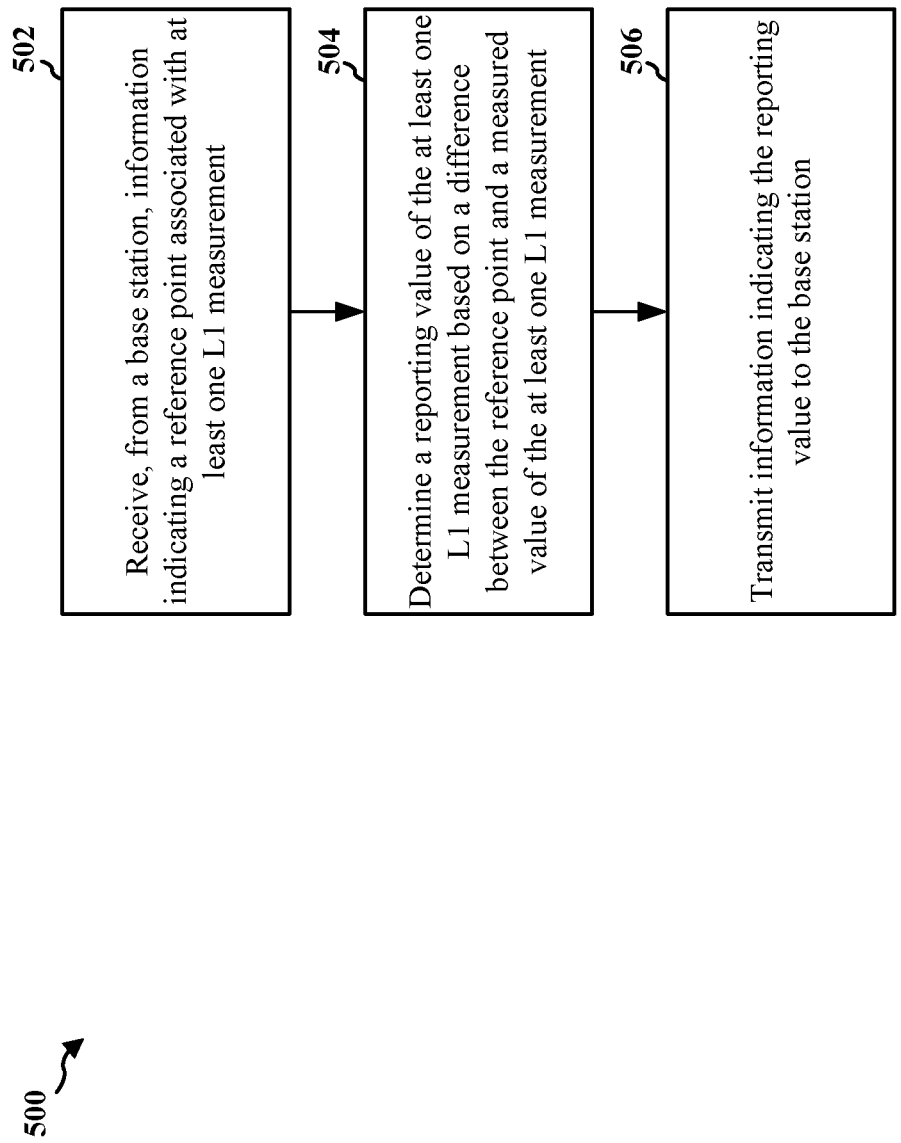
FIG. 5 is a flowchart of a method of wireless communication by a UE.
Figure 6:
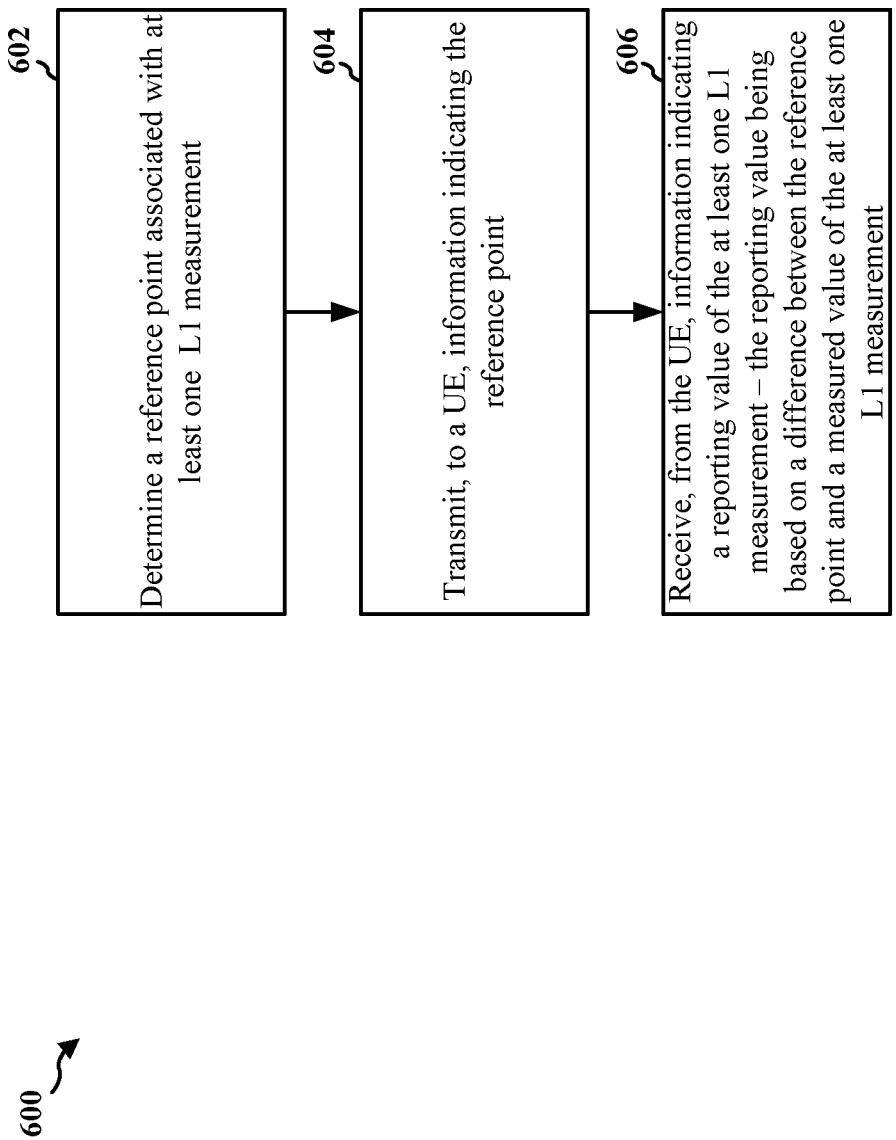
FIG. 6 is a flowchart of a method of wireless communication by a base station.

Referring to FIGS. 4-6, CSI reports are used for beam management between base stations and UE. In particular, CSI reporting is important for beam reliability, which is used for unicast coverage in FR2. A CSI report may include multiple different fields, for example, including a CQI, PMI, CRI, a SLI, and/or a rank indication.

CSI reporting may be periodic, semi-persistent, and/or aperiodic. For example, periodic and semi-persistent CSI reporting may support the periodicities of 5, 10, 20, 40, 80, 160, and/or 320 slots. CSI reporting may occur on an uplink control channel and/or an uplink data channel. For example, periodic CSI reporting may be carried on a short PUCCH or a long PUCCH. Semi-persistent CSI reporting may be carried on a long PUCCH or a PUSCH, and resources and the modulation and coding scheme (MCS) for semi-persistent CSI reporting on the PUSCH may be allocated semi-persistently via DCI. Further, semi-persistent CSI reporting may support Type II with a minimum periodicity of 5 milliseconds (ms). However, semi-persistent CSI reporting may not be supported for aperiodic CSI-RS (although this may not preclude one CSI reporting being carried by multiple uplink reporting instances). A periodic CSI reporting may be carried on PUSCH multiplexed with or without uplink data.

In some aspects, a CSI report may include a L1 reference signal receive power (RSRP) and/or L1 signal-to-interference-plus-noise ratio (SINR). The L1-RSRP and/or L1-SINR may be used for beam management. For example, L1-SINR may be used for beam selection considering interference (and L1-RSRP may have a similar format). Such L1 measurements may be relatively large (e.g., approximately 20 bits), which may cause poor coverage when carried on the PUCCH.

In CSI reporting that includes L1 measurements, up to 4 beams can be reported per configured report. The absolute SINR value (or RSRP value) may be reported for the first beam, which may be the beam having the highest SINR (or RSRP). However, differential SINR values (or differential RSRP values) may be reported for the remaining beams—that is, the differential SINR values (or differential RSRP values) may be computed with respect to the highest SINR value (or highest RSRP value).

Table 1 illustrates some configurations of CSI reporting, according to various aspects.

TABLE 1

| CSI report number | CSI fields |
| --- | --- |
| CSI report #n | CRI or SSBRI #1, if reported |
| | CRI or SSBRI #2, if reported |
| | CRI or SSBRI #3, if reported |
| | CRI or SSBRI #4, if reported |
| | SINR #1, if reported |
| | Differential SINR #2, if reported |
| | Differential SINR #3, if reported |
| | Differential SINR #4, if reported |

According to various aspects of the present disclosure, a smaller payload for L1 reporting can help enhance the coverage of the CSI report. In the coverage critical case, having a reliable L1 report may be more important than the resolution and/or thoroughness of the L1 report. Further, in some scenarios, coverage enhancement of the L1 report may be only needed in a transient period (e.g., when the current beam becomes weak until a new beam is selected).

In an L1-RSRP and/or L1-SINR report, 7 bits may be assigned for RSRP (or SINR) of the best beam and 4 bits may be assigned for each of the remaining beams (e.g., for differential values), in addition to the indices of the beams. For example, reporting RSRPs for 4 beams (among 16 beams) may use 33 bits: 7 bits for the best beam+4 bits for beam #2+4 bits for beam #3+4 bits for beam #4+4 bits for best beam index+4 bits for beam #2 index+4 bits for beam #3 index+4 bits for beam #4 index=33 bits, of which almost half are for the reported RSRP (or SINR) values and half for the indices.

If a compact L1 report is activated for only a short period of time, there is a high probability the best beam is among the initial set of k best beams included in the compact L1 report (the absence from the initial k best beams of a beam that becomes the best beam is unlikely).

In order to configure a compact L1 report, a base station may indicate a reference point for reported values of the L1 report. The reference point may be reported for one UE or for a group of UEs. The indication of the L1 report reference point may be via semi-static configuration (e.g., RRC signaling) and/or dynamic indication. This may affect L1-RSRP and/or L1-SINR reports.

The reference point may be used by a UE for reporting the best beam. For example, if −70 decibel-milliwatts (dBm) is indicated as the reference point, the reported RSRP (or SINR) may be reported as a differential value of the RSRP (or SINR) of the best beam compared to −70 dBm, with default step sizes (e.g., 1 dBm). Reporting of other beams may be differential in respect to the best beam (e.g., similar to the aforementioned CSI reporting with L1 report). A dynamic indication of the reference point for the L1 report may be via MAC control element (CE), UE-specific DCI, or group-common DCI. The reference point for L1 report values may be indicated together with the resolution of the L1 report and/or the step size for L1 reporting and/or the indication of compact resolution of the L1 report. For example, a default step size and/or resolution for the L1 report may be preconfigured (e.g., defined in a standard or specification promulgated by 3GPP) or configured by the base station (e.g., gNB), e.g., for the case in which the L1 report reference point is indicated.

FIG. 4 is a call flow diagram of operations in an access network that includes a base station 402 (e.g., gNB) and a UE 404. The base station 402 may determine 422 a reference point associated with at least one L1 measurement. The at least one L1 measurement may be an L1-RSRP and/or L1-SINR. For example, the base station 402 may determine the reference point based on one or more other L1-RSRP and/or L1-SINR values received from the UE 404, e.g., via earlier CSI reporting.

The base station 402 may transmit information indicating the reference point 424 to the UE 404. According to various aspects, the base station 402 may transmit the information indicating the reference point 424 in at least one of an RRC signaling message, a MAC CE, DCI specific to the UE 404, and/or DCI configured for a group of UEs that includes the UE 404.

In some further aspects, the base station 402 may indicate at least one of a step size and/or a number of bits in a message that includes the information indicating the reference point 424. The step size and/or number of bits may be used for L1 measurement reporting by the UE 404, e.g., in order to determine a reporting value and/or resolution of the reporting value. In some other aspects, however, at least one of the step size and/or number of bits may be preconfigured (e.g., defined by a standard and/or specification).

The base station 402 may determine 426 a transient period in which a current beam used for communication with the UE 404 is failing. For example, the base station 402 may determine that a signal quality on a current beam used for communication with the UE 404 is falling below a threshold and/or an error rate associated with communication with the UE 404 on a current beam is meeting and/or exceeding another threshold.

Accordingly, the base station 402 may determine that compact L1 reporting should be used by the UE 404. Therefore, the base station 402 may transmit, to the UE 404, an instruction 428 to use compact L1 reporting, e.g., based on the determination 426 of the transient period. In some aspects, the instruction 428 may be a message that also includes the information indicating the reference point 424.

Correspondingly, the UE 404 may receive the information indicating the reference point 424. Further, the UE 404 may receive the instruction 428 and/or the UE may determine that the transient period is occurring in which the current beam used for communication with the base station 402 is failing. In response, the UE 404 may determine that the UE 404 should use compact L1 reporting.

The base station 402 may transmit a set of reference signals 430 to the UE 404. The reference signals 430 may be, for example, SSBs and/or CSI-RSs. Each of the reference signals 430 may be transmitted on a respective beam that may be used for communication between the base station 402 and the UE 404, and may correspond to an index of the respective beam.

The UE 404 may receive the reference signals 430 and, based thereon, the UE 404 may measure 432 a set of observed values of L1 measurements. For example, the UE 404 may measure a respective RSRP and/or a respective SINR value for each of the reference signals 430 received via the beams available for communication between the base station 402 and the UE 404. The UE 404 may then select the k best observed values, which may correspond to the k beams having the highest RSRP and/or highest SINR (potentially, k may be equal to 1).

The UE 404 may then determine 434 at least one reporting value of at least one L1 measurement based at least one the reference point 424. For example, the UE 404 may determine the at least one reporting value as a differential value that is the difference between the reference point 424 and the observed value.

In some aspects, the UE 404 may determine 434 the at least one reporting value based on a step size (e.g., 1 dB, 2 dB, etc.). For example, the UE 404 may determine the at least one reporting value by quantizing the observed value, such that the UE 404 determines a difference between the reference point 424 and the observed value and then determines a number of steps (of the step size) that corresponds to the difference. For example, if the UE 404 measures an observed value of −65 dBm for the best beam and the reference point is equal to −70 dBm, the UE 404 may determine the difference is 5 dBm, and when the step size corresponds to 2 dB, the UE 404 may determine that the reporting value for the best beam should be 3 steps or (5 dBm)/(2 dB) is equal to 2.5, rounded up to 3.

In some further aspects, the UE 404 may determine 434 the at least one reporting value based on a number of bits. For example, the UE 404 may determine the resolution of the reporting value based on a number of bits. Illustratively, the UE 404 may have three bits or four bits as the resolution to convey the reporting value. The UE 404 may receive the step size and/or the number of bits from the base station 402, e.g., in a message that includes the reference point 424, in a message that includes the instruction 428, and/or in one or more separate messages. In some other aspects, at least one of the step size and/or the number of bits may be preconfigured in the UE 404 (e.g., based on a standard and/or specification).

The UE 404 may then transmit, to the base station 402, the at least one reporting value 436 which may be associated with an index of a beam (e.g., also indicated with the at least one reporting value 436). For example, the UE 404 may transmit a compact L1 report for CSI reporting that indicates the at least one reporting value 436 (e.g., on a PUCCH or PUSCH).

The base station 402 may receive the at least one reporting value 436, and the base station 402 may recover the L1 measurement value conveyed by the UE 404 based on the reference point 424, the step size, and/or the number of bits based upon which the UE 404 determined the at least one reporting value 436. The base station 402 may then select a beam for communication with the UE 404 based on the at least one reporting value 436. For example, the base station 402 may select a beam corresponding to the highest or best of the at least one reporting value 436. The base station 402 may then configure the selected beam for communication with the UE 404.

FIG. 5 is a flowchart of a method 500 of wireless communication. The method 500 may be performed by a UE (e.g., the UE 104, 350, 404). At 502, the UE may receive, from a base station information indicating a reference point associated with at least one L1 measurement. The at least one L1 measurement may be at least one of an L1-RSRP and/or an L1-SINR. The reference point may be received in one of an RRC signaling message, a MAC CE, DCI specific to the UE, or DCI configured for a group of UEs. In some aspects, the UE may further receive an instruction to use the reference point and, potentially, the instruction may include the information indicating the reference point. For example, the instruction may be associated with a transient period in which a current beam used for communication with the base station is failing.

At 504, the UE may determine a reporting value of the at least one L1 measurement based on a difference between the reference point and a measured value of the at least one L1 measurement. In some aspects, the UE may further determine the reporting value based on a step size and/or a number of bits configured for information indicating the reporting value. For example, at least one of the step size and/or the number of bits may be preconfigured, or at least one of the step size and/or the number of bits may be received in a message that also includes the information indicating the reference point.

At 506, the UE may transmit information indicating the reporting value to the base station. In some aspects, the information indicating the reporting value may include information indicating a respective beam index corresponding to the at least one reporting value.

FIG. 6 is a flowchart of a method 600 of wireless communication. The method 600 may be performed by a base station (e.g., the base station 102/180, 310, 402). At 602, that base station may determine a reference point associated with at least one L1 measurement. The at least one L1 measurement may be at least one of an L1-RSRP and/or an L1-SINR.

At 604, the base station may transmit information indicating the reference point to a UE. For example, the base station may transmit the information indicating the reference point in one of an RRC signaling message, a MAC CE, DCI specific to the UE, or DCI configured for a group of UEs. In some aspects, the base station may further transmit an instruction to use the reference point to the UE and, potentially, the instruction may include the information indicating the reference point. For example, the instruction may be associated with a transient period in which a current beam used for communication with the base station is failing.

At 606, the base station may receive, from the UE, information indicating a reporting value of the at least one L1 measurement, and the reporting value may be based on a difference between the reference point and a measured value of the at least one L1 measurement. In some aspects, the reporting value may be further based on a step size and/or a number of bits configured for information indicating the reporting value. For example, at least one of the step size and/or the number of bits may be preconfigured, or at least one of the step size and/or the number of bits may be transmitted by the base station to the UE in a message that also includes the information indicating the reference point. In some aspects, the information indicating the reporting value may include information indicating a respective beam index corresponding to the at least one reporting value. The base station may select a beam for communication with the UE based on the at least one reporting value, e.g., during a transient period.

Figure 7:
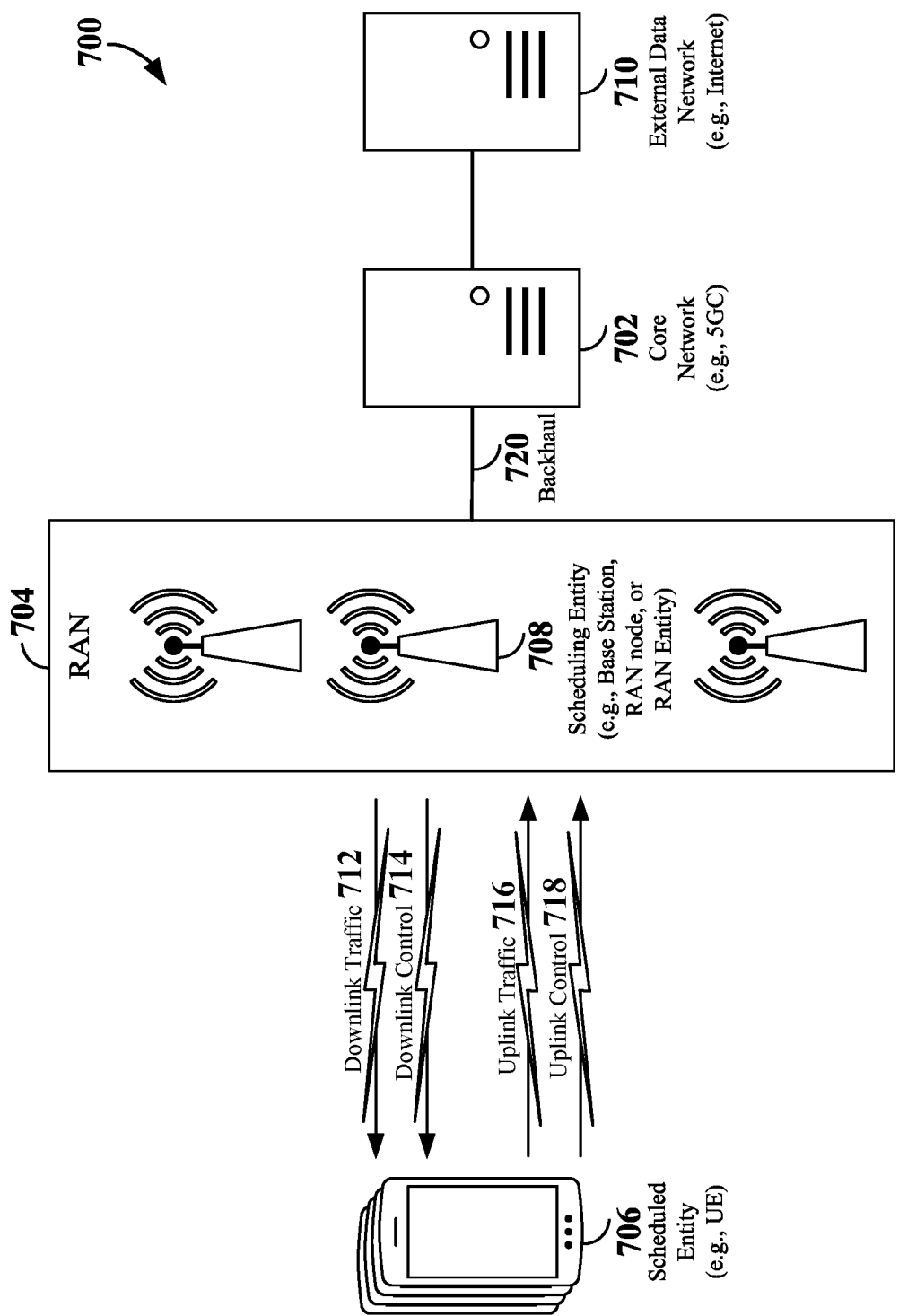
FIG. 7 is a schematic illustration of a wireless communication system within which aspects may be implemented.

FIG. 7 is a schematic illustration of a wireless communication system 700 within which aspects may be implemented. The various concepts presented throughout this disclosure may be implemented across a broad variety of telecommunication systems such as wireless communications system 700, network architectures, and communication standards. The wireless communication system 700 includes three interacting domains: a core network 702, a radio access network (RAN) 704, and a user equipment (UE) 706. By virtue of the wireless communication system 700, the UE 706 may be enabled to carry out data communication with an external data network 710, such as (but not limited to) the Internet.

The RAN 704 may implement any suitable wireless communication technology or technologies to provide radio access to the UE 706. As one example, the RAN 704 may operate according to 3rd Generation Partnership Project (3GPP) New Radio (NR) specifications, often referred to as 5G. As another example, the RAN 704 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 704 includes a plurality of base stations 708. Broadly, as described above, a base station is a network element in a radio access network responsible for radio transmission and reception in one or more cells to or from a UE. In different technologies, standards, or contexts, a base station may variously be referred to by those skilled in the art as a scheduling entity, a RAN entity, or a RAN node, a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 704 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 706 may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs 706 may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

As noted above, NR networks support communication between a base station 708 and high-end UEs 706 for a plurality of different usage cases, including, for example, enhanced mobile broadband (eMBB) and ultra-reliable and low latency communication (URLLC). NR networks may further support communication between a base station and low-end UEs 706 in massive machine-type communication (mMTC) usage cases. In some examples, LTE-M or Narrowband Internet of Things (NB-IoT) technology may be utilized to meet the requirements of mMTC.

In addition to providing services to high-end UEs 706 (e.g., via eMMB and/or URLLC) and low-end UEs 706 (e.g., via mMTC), NR networks may further provide services to reduced capability UEs 706. The service requirements for reduced capability UEs may be less than high-end UEs, but greater than low-end UEs. For example, use cases for reduced capability UEs may include not only URLLC services with high requirements, but also low-end services to accommodate smaller form factors and longer battery lives. Examples of reduced-capability UEs may include, but are not limited to, industrial wireless sensors, surveillance cameras, and wearable devices (e.g., smart watches, rings, eHealth related devices, and medical monitoring devices). In general, reduced capability UEs have a device design with a compact form factor and reduced complexity as compared to high-end UEs. For example, reduced capability UEs may have a reduced number of transmit/receive antennas, reduced device bandwidth (e.g., reduced operating bandwidth of the UE), relaxed processing time, and/or relaxed processing capability. Reduced capability UEs may further be configured for power saving and battery lifetime enhancement in delay tolerant use cases.

The particular services (e.g., eMBB/URLLC/mMTC/reduced capability) provided to a UE may be determined based on a UE category of the UE. UE category information is used to enable the base station to effectively communicate with each UE served by the base station. For example, the UE category may identify the uplink and downlink performance capability of the UE. As an example, the UE category may specify the maximum data rate supported by the UE, the number of component carriers and multiple-input multiple-output (MIMO) layers supported by the UE, and/or the highest modulation supported by the UE. The examples presented herein of UE category differentiators are merely exemplary, and it should be understood that any suitable differences between UE features, whether in hardware or software, may be utilized to differentiate between UE categories.

Wireless communication between a RAN 704 and a UE 706 may be described as utilizing an air interface. Transmissions over the air interface from a base station (e.g., base station 708) to one or more UEs (e.g., UE 706) may be referred to as downlink (DL) transmission. In accordance with certain aspects of the present disclosure, the term downlink may refer to a point-to-multipoint transmission originating at a scheduling entity (described further below; e.g., base station 708). Another way to describe this scheme may be to use the term broadcast channel multiplexing. Transmissions from a UE (e.g., UE 706) to a base station (e.g., base station 708) may be referred to as uplink (UL) transmissions. In accordance with further aspects of the present disclosure, the term uplink may refer to a point-to-point transmission originating at a scheduled entity (described further below; e.g., UE 706).

In some examples, access to the air interface may be scheduled, wherein a scheduling entity (e.g., a base station 708) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 706, which may be scheduled entities, may utilize resources allocated by the scheduling entity 708.

Base stations 708 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in device-to-device (D2D) fashion and/or in relay configuration.

As illustrated in FIG. 7, a scheduling entity 708 may broadcast downlink traffic 712 to one or more scheduled entities 706. Broadly, the scheduling entity 708 is a node or device responsible for scheduling traffic in a wireless communication network, including the downlink traffic 712 and, in some examples, uplink traffic 716 from one or more scheduled entities 706 to the scheduling entity 708. On the other hand, the scheduled entity 706 is a node or device that receives downlink control information 714, including but not limited to scheduling information (e.g., a grant), synchronization or timing information, or other control information from another entity in the wireless communication network such as the scheduling entity 708.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 708 may include a backhaul interface for communication with a backhaul portion 720 of the wireless communication system. The backhaul 720 may provide a link between a base station 708 and the core network 702. Further, in some examples, a backhaul network may provide interconnection between the respective base stations 708. Various types of backhaul interfaces may be employed, such as a direct physical connection, a virtual network, or the like using any suitable transport network.

The core network 702 may be a part of the wireless communication system 700, and may be independent of the radio access technology used in the RAN 704. In some examples, the core network 702 may be configured according to 5G standards (e.g., 5GC). In other examples, the core network 702 may be configured according to a 4G evolved packet core (EPC), or any other suitable standard or configuration.

Figure 8:
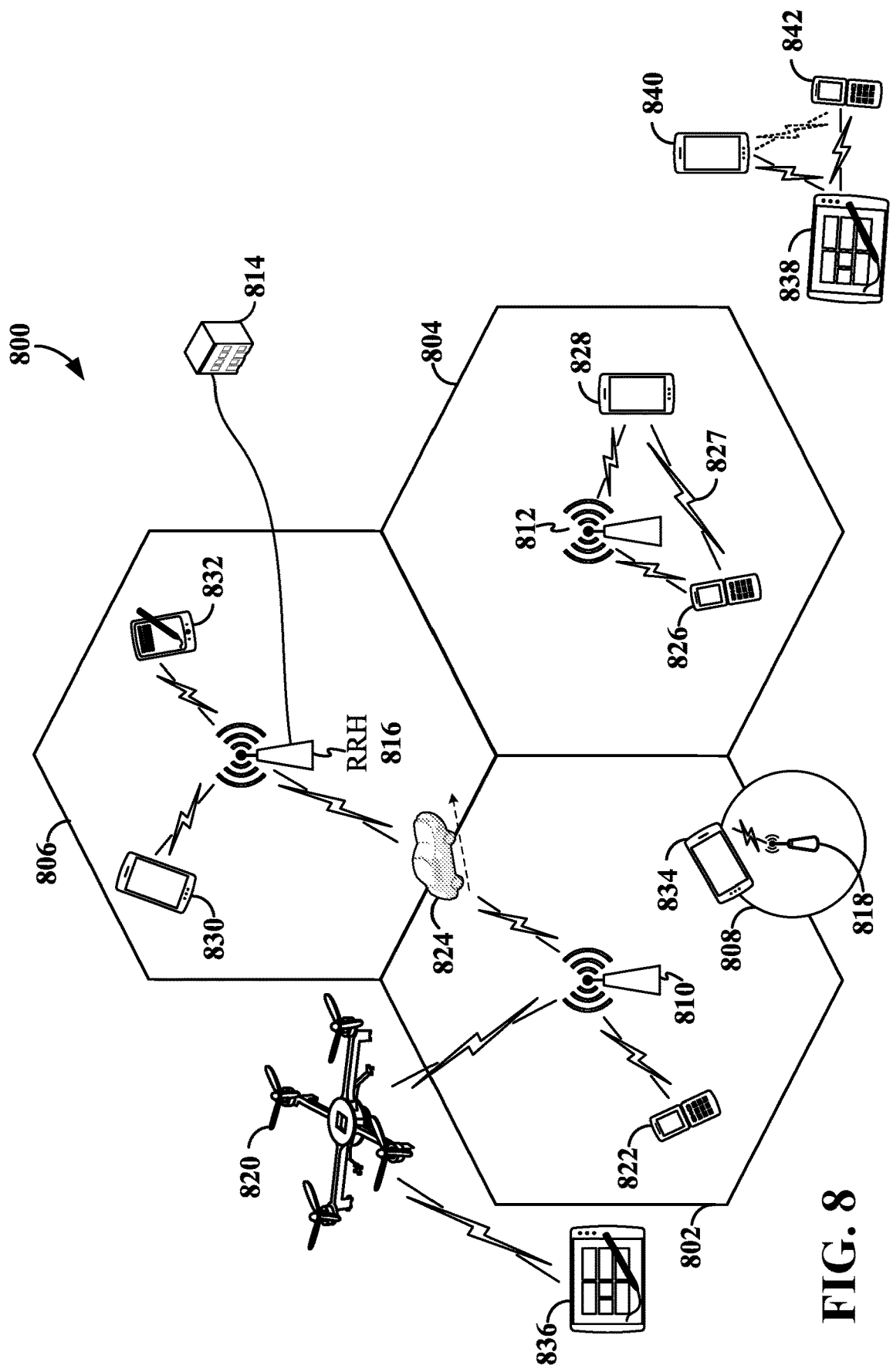
FIG. 8 is a conceptual illustration of an example of a radio access network (RAN) within which aspects may be implemented.

FIG. 8 is a conceptual illustration of an example of a radio access network (RAN) 800 within which aspects may be implemented. By way of example and without limitation, a schematic illustration of a RAN 800 is provided. In some examples, the RAN 800 may be the same as the RAN 704 described above and illustrated in FIG. 7. The geographic area covered by the RAN 800 may be divided into cellular regions (cells) that can be uniquely identified by a user equipment (UE) based on an identification broadcasted from one access point or base station. FIG. 8 illustrates macrocells 802, 804, and 806, and a small cell 808, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 8, two base stations 810 and 812 are shown in cells 802 and 804; and a third base station 814 is shown controlling a remote radio head (RRH) 816 in cell 806. That is, a base station can have an integrated antenna or can be connected to an antenna or RRH by feeder cables. In the illustrated example, the cells 802, 804, and 806 may be referred to as macrocells, as the base stations 810, 812, and 814 support cells having a large size. Further, a base station 818 is shown in the small cell 808 (e.g., a microcell, picocell, femtocell, home base station, home Node B, home eNode B, etc.) which may overlap with one or more macrocells. In this example, the cell 808 may be referred to as a small cell, as the base station 818 supports a cell having a relatively small size. Cell sizing can be done according to system design as well as component constraints.

It is to be understood that the radio access network 800 may include any number of wireless base stations and cells. Further, a relay node may be deployed to extend the size or coverage area of a given cell. The base stations 810, 812, 814, 818 provide wireless access points to a core network for any number of mobile apparatuses. In some examples, the base stations 810, 812, 814, and/or 818 may be the same as the base station/scheduling entity 708 described above and illustrated in FIG. 7.

Within the RAN 800, the cells may include UEs that may be in communication with one or more sectors of each cell. Further, each base station 810, 812, 814, and 818 may be configured to provide an access point to a core network 102 (see FIG. 1) for all the UEs in the respective cells. For example, UEs 822 and 824 may be in communication with base station 810; UEs 826 and 828 may be in communication with base station 812; UEs 830 and 832 may be in communication with base station 814 by way of RRH 816; and UE 834 may be in communication with base station 818. In some examples, the UEs 822, 824, 826, 828, 830, 832, 834, 838, 840, and/or 842 may be the same as the UE/scheduled entity 706 described above and illustrated in FIG. 7.

In some examples, an unmanned aerial vehicle (UAV) 820, which may be a drone or quadcopter, can be a mobile network node and may be configured to function as a UE. For example, the UAV 820 may operate within cell 802 by communicating with base station 810.

In a further aspect of the RAN 800, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 826 and 828) within the coverage area of a serving base station 812 may communicate with each other using sidelink signals 827 without relaying that communication through the base station. In this example, the base station 812 or one or both of the UEs 826 and 828 may function as scheduling entities to schedule sidelink communication between UEs 826 and 828. In some examples, the sidelink signals 827 include sidelink traffic and sidelink control. In a further example, UEs outside the coverage area of a base station may communicate over a sidelink carrier. For example, UE 838 is illustrated communicating with UEs 840 and 842. Here, the UE 838 may function as a scheduling entity or a transmitting sidelink device, and UEs 840 and 842 may each function as a scheduled entity or a receiving sidelink device.

In the RAN 800, the ability for a UE to communicate while moving, independent of its location, is referred to as mobility. The various physical channels between the UE and the RAN are generally set up, maintained, and released under the control of an access and mobility management function (AMF, not illustrated, part of the core network 702 in FIG. 7). In some scenarios, the AMF may include a security context management function (SCMF) and a security anchor function (SEAF) that performs authentication. The SCMF can manage, in whole or in part, the security context for both the control plane and the user plane functionality.

In some examples, the RAN 800 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 824 (illustrated as a vehicle, although any suitable form of UE may be used) may move from the geographic area corresponding to its serving cell 802 to the geographic area corresponding to a neighbor cell 806. When the signal strength or quality from the neighbor cell 806 exceeds that of its serving cell 802 for a given amount of time, the UE 824 may transmit a reporting message to its serving base station 810 indicating this condition. In response, the UE 824 may receive a handover command, and the UE may undergo a handover to the cell 806.

The air interface in the radio access network 800 may utilize one or more multiplexing and multiple access algorithms to enable simultaneous communication of the various devices. For example, 5G NR specifications provide multiple access for UL transmissions from UEs 822 and 824 to base station 810, and for multiplexing for DL transmissions from base station 810 to one or more UEs 822 and 824, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 810 to UEs 822 and 824 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 800 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 9:
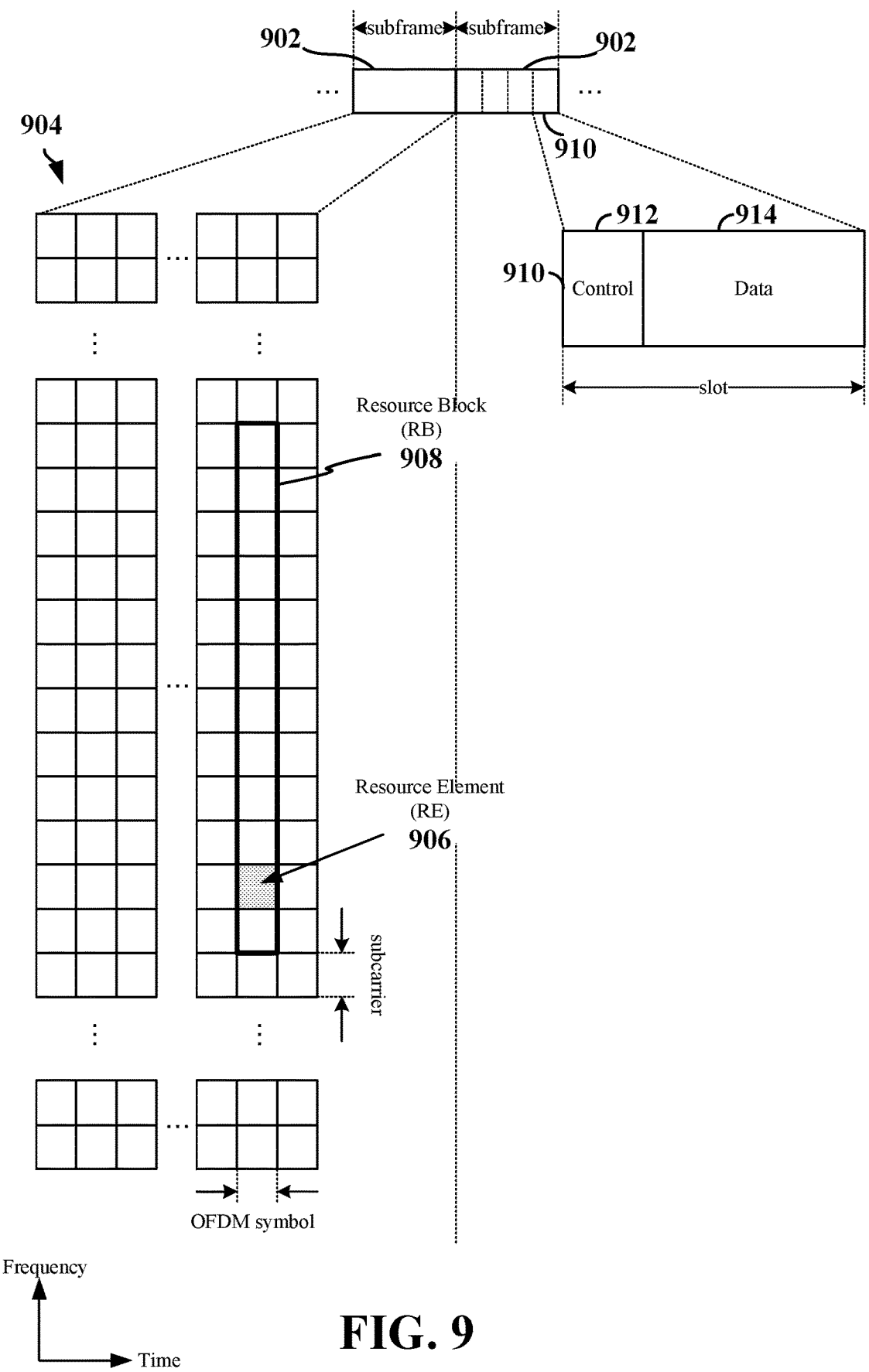
FIG. 9 is a diagram illustrating an example of a frame structure for use in a radio access network within which aspects may be implemented.

FIG. 9 is a diagram illustrating an example of a frame structure for use in a radio access network within which aspects may be implemented. An expanded view of an exemplary DL subframe 902 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 904 may be used to schematically represent time-frequency resources for a given antenna port. That is, in a multiple-input-multiple-output (MIMO) implementation with multiple antenna ports available, a corresponding multiple number of resource grids 904 may be available for communication. The resource grid 904 is divided into multiple resource elements (REs) 906. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 908, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 908 entirely corresponds to a single direction of communication (either transmission or reception for a given device).

Scheduling of UEs (e.g., scheduled entities) for downlink or uplink transmissions typically involves scheduling one or more resource elements 906 within one or more sub-bands or bandwidth parts (BWPs). Thus, a UE generally utilizes only a subset of the resource grid 904. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 908 is shown as occupying less than the entire bandwidth of the subframe 902, with some subcarriers illustrated above and below the RB 908. In a given implementation, the subframe 902 may have a bandwidth corresponding to any number of one or more RBs 908. Further, in this illustration, the RB 908 is shown as occupying less than the entire duration of the subframe 902, although this is merely one possible example.

Each 1 ms subframe 902 may consist of one or multiple adjacent slots. In the example shown in FIG. 9, one subframe 902 includes four slots 910, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 910 illustrates the slot 910 including a control region 912 and a data region 914. In general, the control region 912 may carry control channels, and the data region 914 may carry data channels. Of course, a slot may contain all DL, all UL, or at least one DL portion and at least one UL portion. The structure illustrated in FIG. 9 is merely exemplary in nature, and different slot structures may be utilized, and may include one or more of each of the control region(s) and data region(s).

Although not illustrated in FIG. 9, the various REs 906 within a RB 908 may be scheduled to carry one or more physical channels, including control channels, shared channels, data channels, etc. Other REs 906 within the RB 908 may also carry pilots or reference signals. These pilots or reference signals may provide for a receiving device to perform channel estimation of the corresponding channel, which may enable coherent demodulation/detection of the control and/or data channels within the RB 908.

In some examples, the slot 910 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 906 (e.g., within the control region 912) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 906 (e.g., in the control region 912 or the data region 914) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB 1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 906 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 906 (e.g., within the data region 914) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 906 within the data region 914 may be configured to carry other signals, such as one or more SIBs and DMRSs.

In an example of sidelink communication over a sidelink carrier via a PC5 interface, the control region 912 of the slot 910 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 914 of the slot 910 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 906 within slot 910. For example, HARQ feedback information may be transmitted in a physical sidelink feedback channel (PSFCH) within the slot 910 from the receiving sidelink device to the transmitting sidelink device. In addition, one or more reference signals, such as a sidelink SSB and/or a sidelink CSI-RS, may be transmitted within the slot 910.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 7-9 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 10:
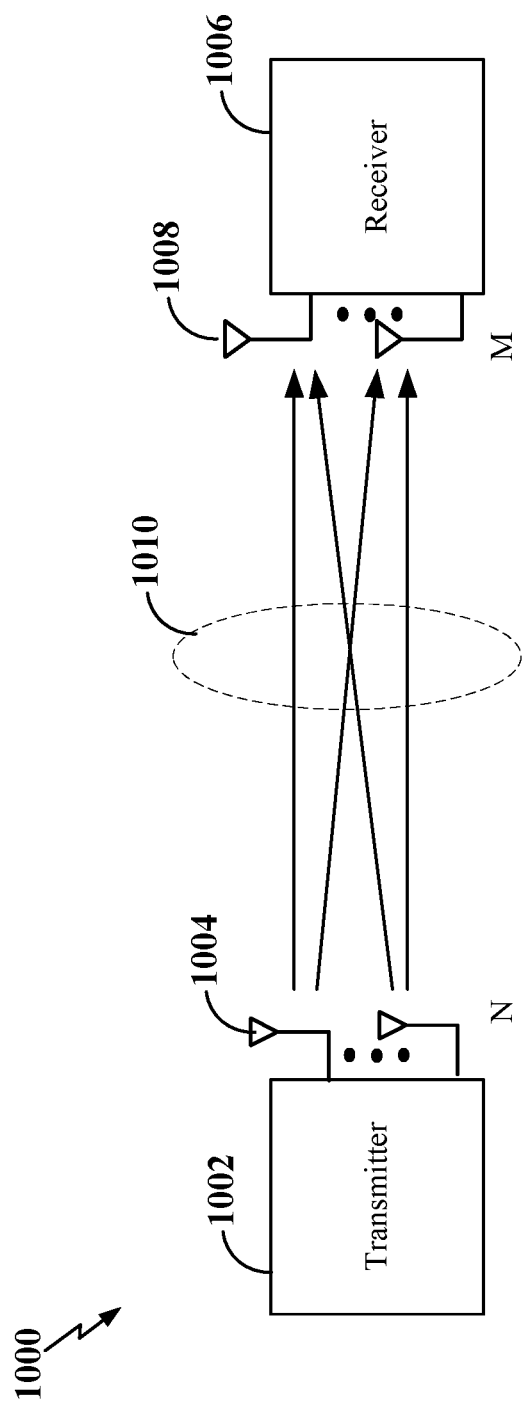
FIG. 10 is a block diagram illustrating a wireless communication system supporting beamforming and/or multiple-input multiple-output (MIMO) communication and within which aspects may be implemented.

FIG. 10 is a block diagram illustrating a wireless communication system supporting beamforming and/or multiple-input multiple-output (MIMO) communication and within which aspects may be implemented. In some aspects of the disclosure, the scheduling entity and/or scheduled entity may be configured for beamforming and/or multiple-input multiple-output (MIMO) technology. In a MIMO system, a transmitter 1002 includes multiple transmit antennas 1004 (e.g., N transmit antennas) and a receiver 1006 includes multiple receive antennas 1008 (e.g., M receive antennas). Thus, there are N×M signal paths 1010 from the transmit antennas 1004 to the receive antennas 1008. Each of the transmitter 1002 and the receiver 1006 may be implemented, for example, within a scheduling entity, a scheduled entity, or any other suitable UE.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 1000 is limited by the number of transmit or receive antennas 1004 or 1008, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 10, a rank-2 spatial multiplexing transmission on a 2×2 MIMO antenna configuration will transmit one data stream from each transmit antenna 1004. Each data stream reaches each receive antenna 1008 along a different signal path 1010. The receiver 1006 may then reconstruct the data streams using the received signals from each receive antenna 1008.

Beamforming is a signal processing technique that may be used at the transmitter 1002 or receiver 1006 to shape or steer an antenna beam (e.g., a transmit beam or receive beam) along a spatial path between the transmitter 1002 and the receiver 1006. Beamforming may be achieved by combining the signals communicated via antennas 1004 or 1008 (e.g., antenna elements of an antenna array module) such that some of the signals experience constructive interference while others experience destructive interference. To create the desired constructive/destructive interference, the transmitter 1002 or receiver 1006 may apply amplitude and/or phase offsets to signals transmitted or received from each of the antennas 1004 or 1008 associated with the transmitter 1002 or receiver 1006.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as a SSB or CSI-RS, on each of a plurality of beams in a beam-sweeping manner. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams and transmit a beam measurement report (e.g., a Layer 1 (L1) measurement report) to the base station indicating the RSRP or SINR of one or more of the measured beams. The base station may then select the particular beam for communication with the UE based on the L1 measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub 6 GHz systems.

Figure 11:
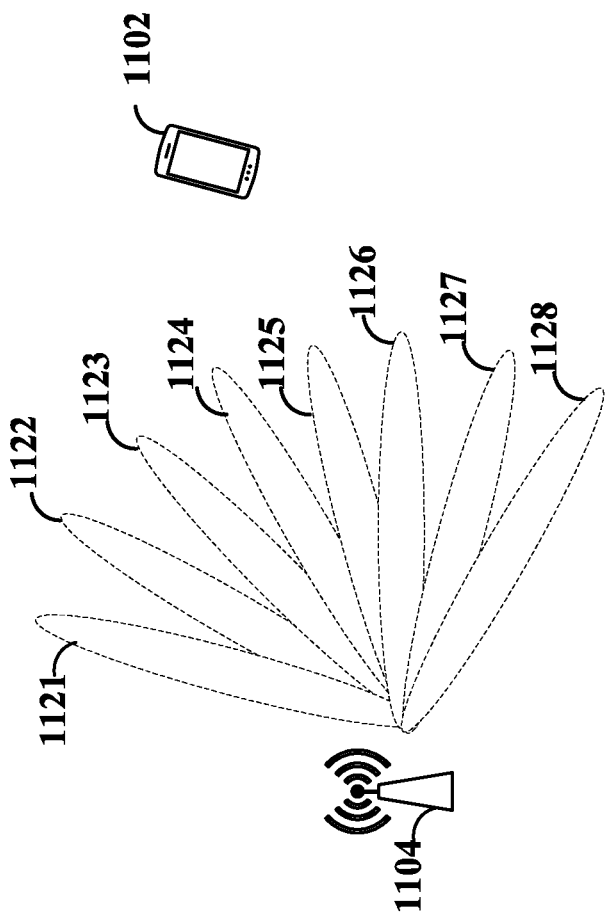
FIG. 11 is a diagram illustrating an example of communication between a radio access network (RAN) node and a user equipment (UE) using beamforming and within which aspects may be implemented.

FIG. 11 is a diagram illustrating an example of communication between a radio access network (RAN) node 1104 and a user equipment (UE) 1102 using beamforming and within which aspects may be implemented. The RAN node 1104 may be any of the base stations or scheduling entities illustrated in FIGS. 7 and 8, and the UE 1102 may be any of the UEs or scheduled entities illustrated in FIGS. 7 and 8. It should be noted that while some beams are illustrated as adjacent to one another, such an arrangement may be different in different aspects. In some examples, beams transmitted during a same symbol may not be adjacent to one another. In some examples, the RAN node 1104 may transmit more or less beams distributed in all directions (e.g., 360 degrees).

In the example shown in FIG. 11, a beam set contains eight different beams 1121, 1122, 1123, 1124, 11211, 1126, 1127, 1128, each associated with a different beam direction. In some examples, the RAN node 1104 may be configured to sweep or transmit each of the beams 1121, 1122, 1123, 1124, 1125, 1126, 1127, 1128 during a synchronization slot. For example, the RAN node 1104 may transmit a reference signal, such as a SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)).

The UE 1102 searches for and identifies the beams based on the beam reference signals. The UE 1102 then performs beam measurements (e.g., RSRP, SINR, RSRQ, etc.) on the beam reference signals to determine the respective beam quality of each of the beams. In examples in which the UE 1102 is in a RRC connected state, the UE 1102 may generate and transmit an L1 measurement report, including the respective beam identifier (beam index) and beam measurement of one or more of the beams 1121-1128 to the RAN node 1104. The RAN node 1104 may then determine the downlink beam (e.g., beam 1124) on which to transmit unicast downlink control information and/or user data traffic to the UE 1102. In some examples, the selected downlink beam has the highest gain from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the RAN node 1104 may derive a downlink beam. Derivation of the downlink beam can be based on uplink measurements performed by the RAN node 1104, such as by measuring the received power, quality, or other variable of a sounding reference signal (SRS) or other uplink reference signal transmitted by the UE 1102. In some examples, the RAN node 1104 may derive the downlink beam based on a combination of the L1 measurement report and uplink measurements.

In examples in which the UE 1102 is in a RRC idle state, the UE 1102 may use the beam measurements to select a downlink beam on which to receive broadcast communications from the RAN node 1104. The broadcast communications may include, for example, paging messages transmitted from the RAN node 1104 to the UE 1102 when new data arrives for the UE 1102 at the network. In some examples, a paging message may be broadcast by the RAN node 1104 over multiple downlink beams. The paging message may then be received by the UE 1102 on the selected downlink beam.

In addition to L1 measurement reports, the UE 1102 can further utilize the beam reference signals to estimate the channel quality of the channel between the RAN node 1104 and the UE 1102. For example, the UE may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The scheduling entity may use the CSI report to select a rank for the scheduled entity, along with a precoding matrix and a MCS to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

The RAN node 1104 and UE 1102 may support different types of CSI reports (including L1 measurement reports) and/or different types of measurements. For example, self-contained CSI (e.g., CSI is transmitted back to the RAN node 1104 in the same slot as the CSI-RS is transmitted from the RAN node) or non-self-contained CSI (e.g., CSI is transmitted back to the RAN node 1104 in a later slot than the slot in which the CSI-RS is transmitted from the RAN node) may be supported. To distinguish between the different report/measurement types and measurement configurations, CSI-RS pilots may be mapped to specific resource elements (REs) and ports for each of the report/measurement types and report/measurement configurations.

Figure 12:
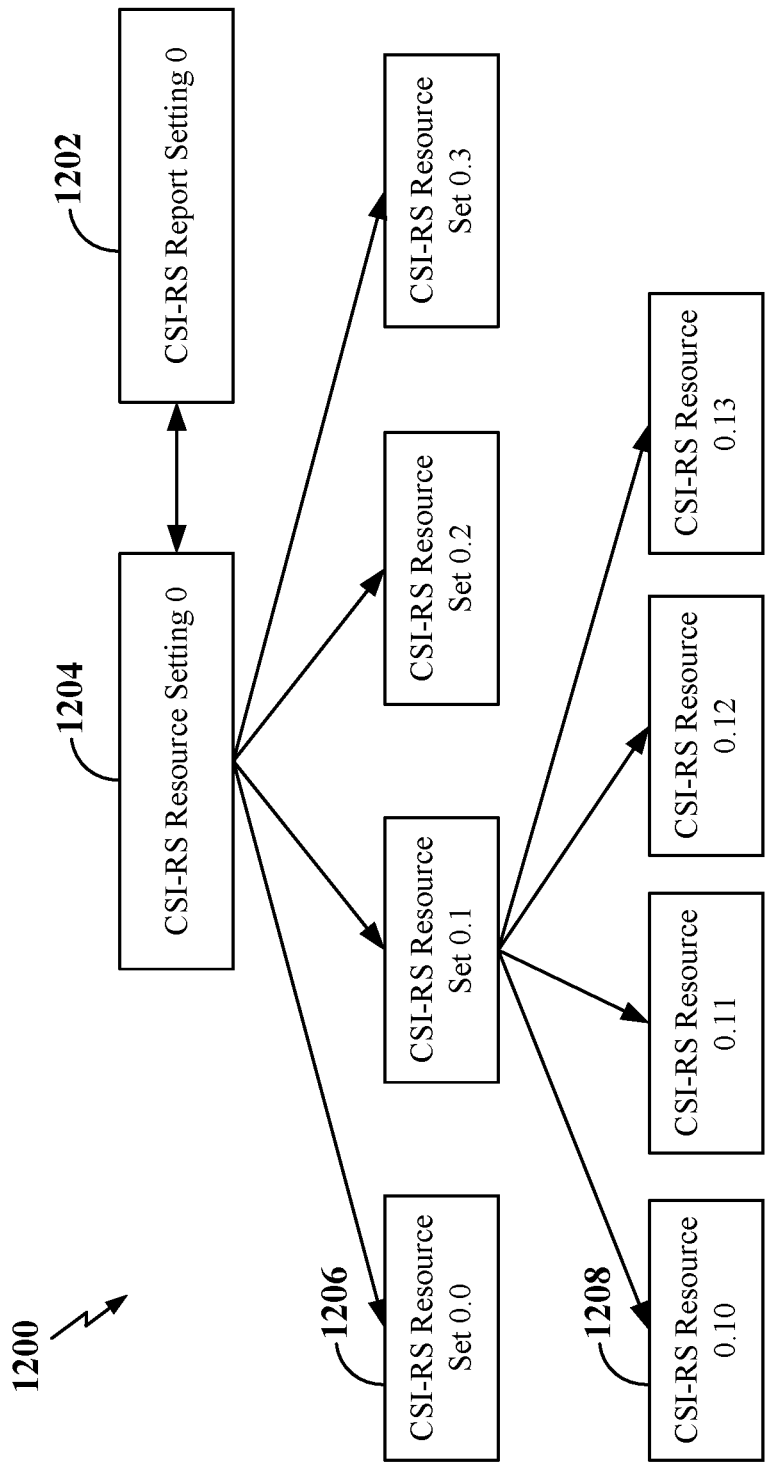
FIG. 12 is a diagram illustrating an example of channel state information (CSI) resource mapping within which aspects may be implemented.

FIG. 12 is a diagram illustrating an example of channel state information (CSI) resource mapping within which aspects may be implemented. An exemplary CSI resource mapping 1200 can be used to support different report/measurement configurations. The CSI resource mapping includes CSI report setting 1202, CSI resource settings 1204, CSI resource sets 1206, and CSI resources 1208. Each CSI resource setting 1204 includes one or more CSI resource sets 1206, and each CSI resource set 1206 includes one or more CSI resources 1208. In the example shown in FIG. 12, a single CSI resource setting (e.g., CSI resource setting 0) is illustrated.

However, it should be understood that any suitable number of CSI resource settings 1204 may be supported.

Each CSI report setting 1202 may include a reportQuantity that indicates, for example, the specific CSI parameters and granularity thereof (e.g., wideband/sub-band CQI, PMI, RI, LI, etc.), or L1 parameters (e.g., L1-RSRP, L1-SINR) to include in a CSI report. The CSI report setting 1202 may further indicate a periodicity of the CSI report. For example, the CSI report setting 1202 may indicate that the report should be generated periodically, aperiodically, or semi-persistently. For aperiodic CSI report settings, the CSI report may be sent on the PUSCH. For periodic CSI report settings, the CSI report may be sent on the PUCCH. For semi-persistent CSI report settings, the CSI report may be sent on the PUCCH or the PUSCH. For example, semi-persistent CSI reports sent on the PUCCH may be activated or deactivated using a medium access control (MAC) control element (MAC-CE). Semi-persistent CSI reports sent on the PUSCH may be triggered using downlink control information (DCI) scrambled with a semi-persistent CSI (SP-CP) radio network temporary identifier (SP-CP-RNTI). CSI report settings 1202 may further include a respective priority and other suitable parameters.

Each CSI report setting 1202 may be linked to a CSI resource setting 1204. Each CSI resource setting 1204 may be associated with a particular time domain behavior of reference signals. For example, each CSI resource setting 1204 may include periodic, semi-persistent, or aperiodic CSI resources 1208. For periodic and semi-persistent CSI resource settings 1204, the number of configured CSI resource sets 1206 may be limited to one. In general, the CSI resource settings 1204 that may be linked to a particular CSI report setting 1202 may be limited by the time domain behavior of the CSI resource setting 1204 and the CSI report setting 1202. For example, an aperiodic CSI report setting 1202 may be linked to periodic, semi-persistent, or aperiodic CSI resource settings 1204. However, a semi-persistent CSI report setting 1202 may be linked to only periodic or semi-persistent CSI resource settings 1204. In addition, a periodic CSI report setting 1202 may be linked to only a periodic CSI resource setting 1204.

Each CSI resource set 1206 may be associated with a CSI resource type. For example, CSI resource types may include non-zero-power (NZP) CSI-RS resources, SSB resources, or channel state information interference measurement (CSI-IM) resources.

Thus, each CSI resource set 1206 includes a list of CSI resources 1208 of a particular CSI resource type. In addition, each CSI resource set 1206 may further be associated with one or more of a set of frequency resources (e.g., a bandwidth and/or OFDM symbol(s) within a slot), a particular set of ports, a power, or other suitable parameters.

Each CSI resource 1208 indicates the particular beam (e.g., ports), frequency resource, and OFDM symbol on which the reference signal may be measured by the UE. For example, each CSI-RS resource 1208 may indicate an RE on which a CSI-RS pilot or SSB transmitted from a particular set of ports (e.g., on a particular beam) may be measured. In the example shown in FIG. 12, CSI-RS resource set 0.1 includes four CSI-RS resources (CSI-RS resource 0.10, CSI-RS resource 0.11, CSI-RS resource 0.12, and CSI-RS resource 0.13). Each CSI resource 1208 may further be indexed by a respective beam identifier (ID). The beam ID may identify not only the particular beam (e.g., ports), but also the resources on which the reference signal may be measured. For example, the beam ID may include a CSI-RS resource indicator (CRI) or a SSB resource indicator (SSBRI).

A RAN node may configure a UE with one or more CSI report settings 1202 and CSI resource settings 1204 via, for example, radio resource control (RRC) signaling. For example, the RAN node may configure the UE with a list of periodic CSI report settings 1202 indicating the associated CSI resource set 1206 that the UE may utilize to generate periodic CSI reports. As another example, the RAN node may configure the UE with a list of aperiodic CSI report settings in a CSI-AperiodicTriggerStateList. Each trigger state in the CSI-AperiodicTriggerStateList may include a list of aperiodic CSI report settings 1202 indicating the associated CSI resource sets 1206 for channel (and optionally interference) measurement. As another example, the RAN node may configure the UE with a list of semi-persistent CSI report settings in a CSI-SemiPersistentOnPUSCH-TriggerStateList. Each trigger state in the CSI-SemiPersistentOnPUSCH-TriggerStateList may include one CSI report setting 1202 indicating the associated CSI resource set 1206. The RAN node may then trigger one or more of the aperiodic or semi-persistent trigger states using, for example, DCI. As indicated above, a MAC-CE may be used to activate or deactivate a semi-persistent CSI report setting 1202 for a CSI report sent on the PUCCH.

For L1-RSRP measurement reports, the UE may be configured with a CSI resource setting 1204 having up to sixteen CSI resource sets 1206. Each of the CSI resource sets 1206 may include up to sixty-four CSI resources 1208 in each set. The total number of different CSI resources 1208 over all the CSI resource sets 1206 may be no more than 128. For L1-SINR measurement reports, the UE may be configured with a CSI resource setting 1204 that can include up to 64 CSI resources 1208 (e.g., up to 64 CSI-RS resource or up to 64 SSB resources). In examples in which the UE includes two antenna panels, and therefore, is capable of measuring two beams at a time, the UE may be configured for group-based beam reporting in which the UE may measure beams from different transmission and reception points (TRPs). In this example, a single L1 measurement report may include measurements from both TRPs (e.g., the best beam (highest RSRP or SINR) from a first TRP and the best beam from a second TRP). Here, the different CSI-RS or SSB beams from each TRP may be received and measured simultaneously.

Aspects of the present disclosure generally relate to reducing the size of measurement reports, particularly Layer 1 (L1) measurement reports reporting beam measurements such as reference signal received power (RSRP) or signal-to-interference-plus-noise ratio (SINR). In many scenarios, such as weak coverage or critical coverage scenarios, reliability may be more important than resolution. In such scenarios, radio resource control (RRC) signaling can indicate to a user equipment (UE) that a measurement report is to be transmitted with reduced resolution. The configurations of the measurement reports, often called report settings, can indicate the number of bits with which to report the beam measurements and the resource indicators. The RRC signaling can indicate that the reported beam measurements in measurement reports associated with a specific report setting are to have less resolution. For example, a radio access network (RAN) node can indicate to a UE to reduce the length or size of the reported beam measurements in L1-SINR measurement reports by two bits. For example, an L1-SINR measurement report can report four beam measurements with seven bits used for first beam and four bits used for the rest of the beams, a total of 19 bits. A reduced resolution L1-SINR measurement report can report the four beam measurements with five bits used for first beam and two bits used for the rest of the beams, a total of 11 bits and a 42% reduction from 19 bits. At a later time, when reduced resolution reports are no longer desired, RRC signaling can indicate to the UE that reduced resolution measurement reports should no longer be sent.

Particular aspects of the subject matter described in this disclosure can be implemented to one or more of the following potential advantages. In some aspects, the disclosed techniques can be used to reduce the size of a measurement report by reducing the size of the measurement report's payload. More measurement reports can be reliably sent when the size of measurement reports is reduced. In some aspects, smaller payloads in beam measurement reports result in more reliable delivery where coverage is weak and where coverage is critical.

Figure 13:
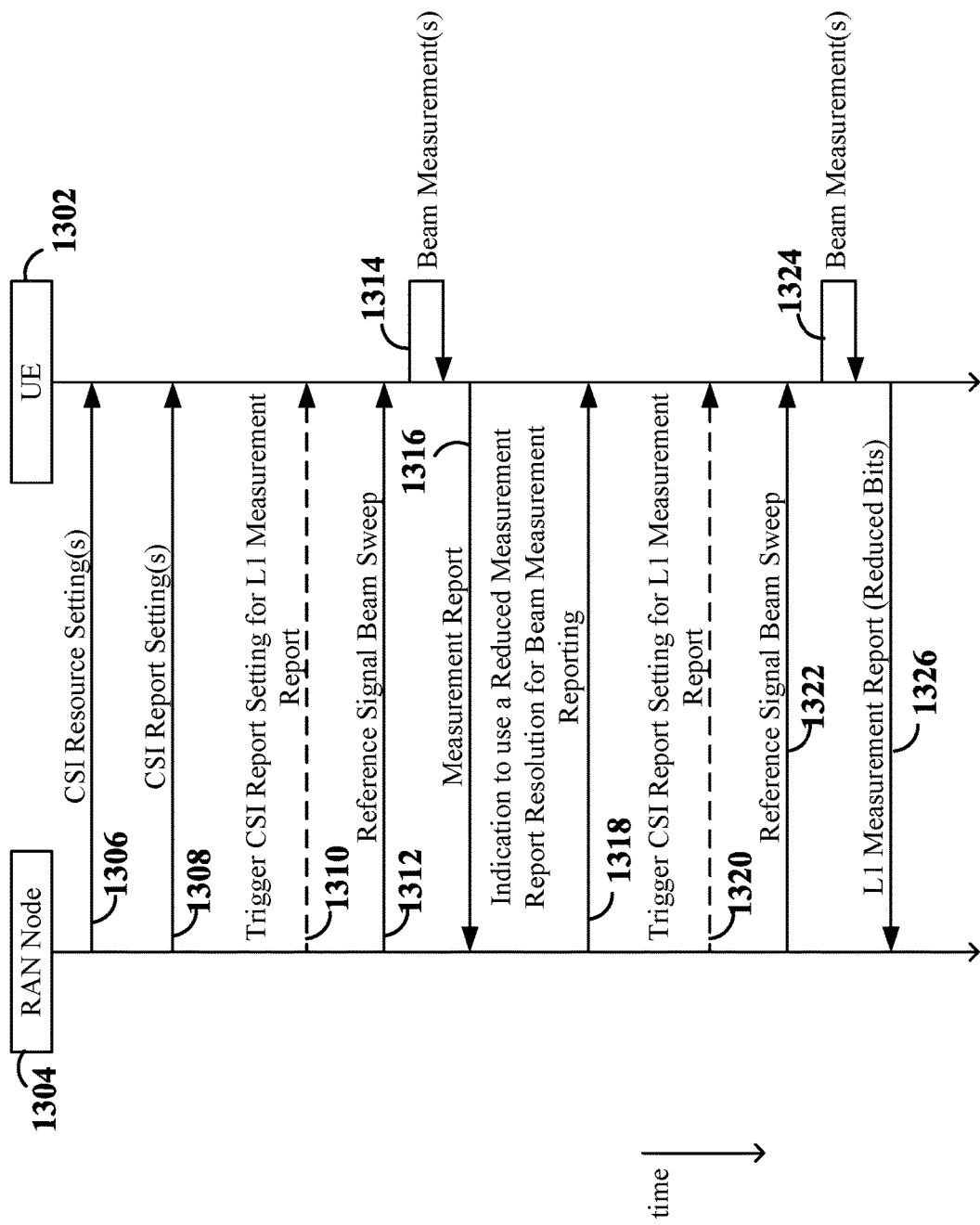
FIG. 13 is a diagram illustrating an example of signaling between a user equipment (UE) and a RAN node according to some aspects.

FIG. 13 is a diagram illustrating an example of signaling between a UE 1302 and a RAN node 1304 according to some aspects. The UE 1302 may correspond to any of the UEs or scheduled entities shown in FIGS. 1, 2, 4, and/or 5. In addition, the RAN node 1304 may correspond to any of the base stations (e.g., gNB, eNB, or TRP) or scheduling entities shown in FIGS. 1, 2, 4, and/or 5.

At 1306 and 1308, the RAN node 1304 can transmit one or more CSI resource setting(s) and one or more CSI report setting(s) to the UE 1302 to configure the UE with the one or more CSI report setting(s) and associated CSI resource setting(s). In some examples, the CSI report setting(s) and associated CSI resource setting(s) may be transmitted to the UE via RRC signaling.

In examples in which the CSI report setting(s) include periodic L1 measurement report setting(s), the UE may utilize the periodic L1 measurement report setting(s) to generate corresponding measurement reports. In examples in which the CSI report setting(s) include aperiodic or semi-persistent L1 measurement report setting(s), at 1310, the RAN node 1304 may trigger an aperiodic or semi-persistent L1 measurement report setting via, for example, DCI or a MAC-CE.

At 1312, the RAN node 1304 can perform a beam sweep to transmit a reference signal (e.g., a SSB or CSI-RS) on each of a plurality of beams to the UE 1302. At 1314, the UE 1302 identifies and measures the RSRP or SINR of a respective beam reference signal on one or more configured beams (e.g., based on the CSI resources in the CSI resource set(s) associated with the CSI report setting).

At 1316, the UE 1302 can transmit a measurement report (e.g., L1-RSRP or L1-SINR for SSB or CSI-RS) to the RAN node 1304 in accordance with the CSI report setting(s). For a particular CSI report setting, up to four L1 measurements (e.g., up to four different beams) may be included in the measurement report. The largest measured value may be quantized to seven bits and may be absolute. Absolute means that the quantized measured value is reported. For L-RSRP or L1-SINR measurement reports or if group-based beam reporting is enabled, each of the other included measurements (up to three measurements) in the measurement report may be differential measurements (with respect to the largest measured value) that are quantized to four-bit values. The beam measurements for multiple CSI report settings may be sent in a single PUCCH/PUSCH payload (e.g., a single L1 measurement report). The number of CSI report settings may be limited though by the PUCCH/PUSCH payload size. For example, if the payload size is not sufficient to carry all of the CSI report settings, CSI report settings with the lowest priority may be dropped.

However, for stationary reduced capability devices, such as industrial sensors and video surveillance cameras, the channel conditions may not vary frequently. Therefore, the beam(s) and the order of the beams in the measurement report(s) may not change often. Various aspects of the disclosure relate to reducing the payload size for measurement reports. A reduction in measurement report payload size can improve reporting coverage by maximizing the number of CSI report settings that may be sent in a PUCCH/PUSCH payload. In addition, reducing the measurement report payload size can enable a reduction in the amount of repeated information (e.g., CRI/SSBRI) included in each measurement report.

At 1318, the RAN node indicates to the UE that a reduced measurement report resolution should be used for beam measurement reporting. For example, the CSI-RS report settings for the measurement report can indicate that the first measurement report resolution for a beam, such as the best beam, in the measurement report is 7 bits. Resolution can be reduced by using fewer bits. As such, the reduced measurement report resolution for the beam can be 5 bits, which is a reduction of two bits of resolution.

At 1320, the RAN node 1304 may trigger the measurement report that uses the reduced measurement report resolution via, for example, DCI or a MAC-CE. At 1322, the RAN node 1304 can perform a beam sweep to transmit a reference signal on each of a plurality of beams to the UE 1302. At 1324, the UE 1302 identifies and measures the RSRP or SINR of a respective beam reference signal on one or more configured beams. At 1326, the UE 1302 can transmit a measurement report using the reduced measurement report resolution to the RAN node 1304.

Figure 14:
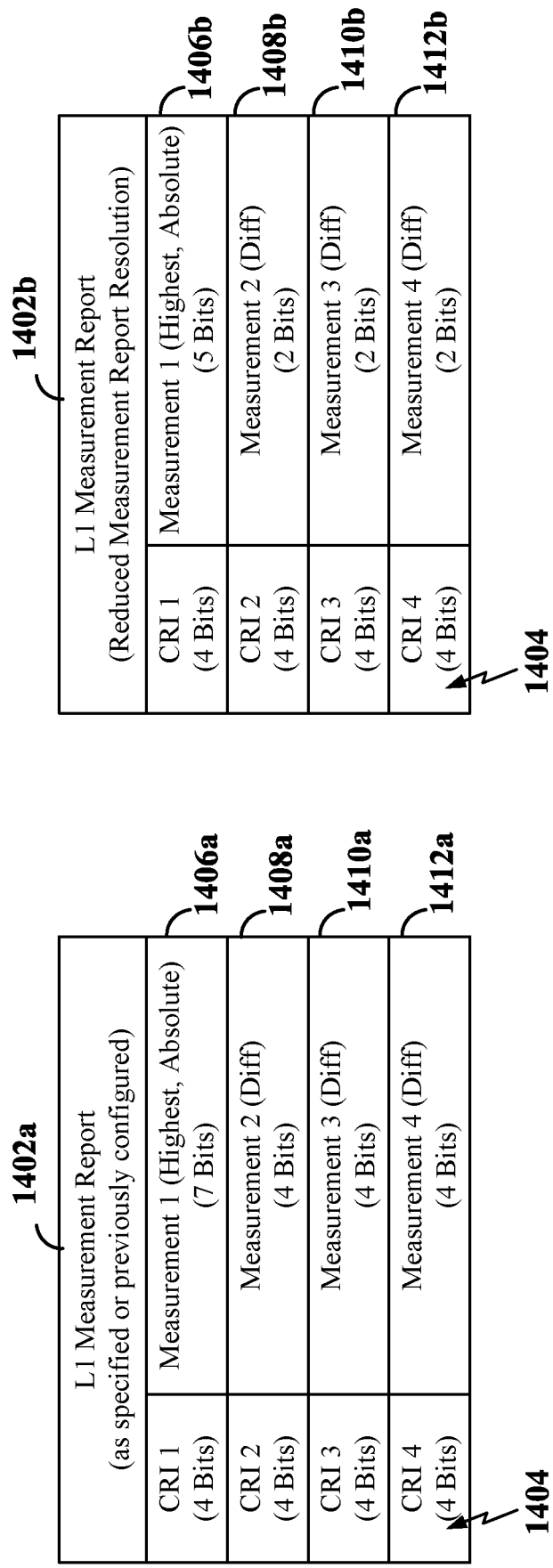
FIG. 14 is a diagram illustrating examples of various configurations of measurement reports according to some aspects.

FIG. 14 is a diagram illustrating examples of various configurations of measurement reports according to some aspects. In the example shown in FIG. 14, Measurement report configuration 1402a used the first measurement report resolution that was indicated to be used for previously specified or configured L1 measurement report. Measurement report configuration 1402b shows the previously specified or configured measurement report configuration 1402a reconfigured to use a reduced measurement report resolution. A measurement report can be specified or configured via CSI-RS report settings, as discussed above. A measurement report can alternatively be specified or configured by setting the report configuration in some other way such as by loading the configuration into non-transient memory during manufacturer of the UE or at some other point in the supply chain that delivers the UE to a user. The measurement report is previously specified or configured because the configuration is stored in the UE before the UE is instructed to use a reduced measurement report resolution for the measurement report.

Measurement report configuration 1402a can provide measurement data for four beam measurements. The CRIs 804 are specified as having four bits and can therefore each indicate one of sixteen beams. CRI 1 is the CRI of the beam with the reported value in measurement 1 1406a. CRI 2 is the CRI of the beam with the reported value in measurement 2 1408a. CRI 3 is the CRI of the beam with the reported value in measurement 3 1410a. CRI 4 is the CRI of the beam with the reported value in measurement 4 1412a.

The beam measurements in measurement report configuration 1402a can use a first measurement report resolution. In the non-limiting example of FIG. 14, the first measurement report resolution is specified as shown in FIG. 14 and uses seven bits for a first beam 1406a, four bits for a second beam 1408a, four bits for a third beam 1410a, and four bits for a fourth beam 1412a. A seven bit integer can have one of 127 values and a four bit integer can have one of sixteen integral values. A beam measurement reported with seven bits can be the seven bit integral value multiplied by a quantization level. In general, a reported beam measurement using N bits can be the N bit integral value multiplied by a quantization level. For L-RSRP or L1-SINR measurement reports, the quantization level can be expressed in decibels (dB).

The first reported beam measurement 1406a in configuration 1402a is specified as an absolute seven bit reported beam measurement. The second reported beam measurement 1408a, third reported beam measurement 1410a, and fourth reported beam measurement 1412a in configuration 1402a are specified as differential four bit reported beam measurements referencing the first reported beam measurement 1406a. In one non-limiting example of SINR measurements using a 0.5 dB quantization level, the first reported beam measurement 1406a is "0000111" and the second reported beam measurement 1408a is "0000011". In this example, "0000111" has the integral value 7 and "0000011" has the integral value 3. The first reported beam measurement 1406a is therefore 7*0.5 db=3.5 dB SINR. The second reported beam measurement 1408a is therefore (7-3)*0.5 db=2.0 db. The first reported beam measurement 1406a often reports the highest beam measurement (often called the best beam) while the remaining reported measurements are, in order, the second highest, third, highest, etc.

Measurement report configuration 1402b is a reduced measurement report resolution reconfiguration of measurement report configuration 1402a. The first reported beam measurement 1406b in configuration 1402b is specified as an absolute five bit reported beam measurement. The second reported beam measurement 1408b, third reported beam measurement 1410b, and fourth reported beam measurement 1412b in configuration 1402b are specified as a differential two bit reported beam measurements referencing the first reported beam measurement 1406b. An indication, sent by a RAN to a UE, can indicate that a measurement report previously specified as using configuration 1402a is to reduce resolution by using two fewer bits for each reported value. As such the measurement report is sent using configuration 1402b.

Figure 15A:
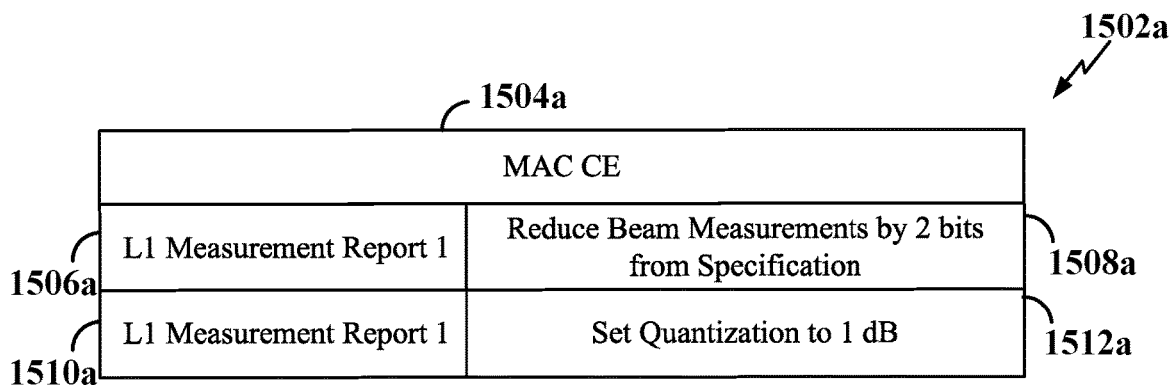
FIGS. 15A-C are conceptual diagrams illustrating examples of indications indicating reduced measurement report resolutions according to some aspects.
Figure 15B:
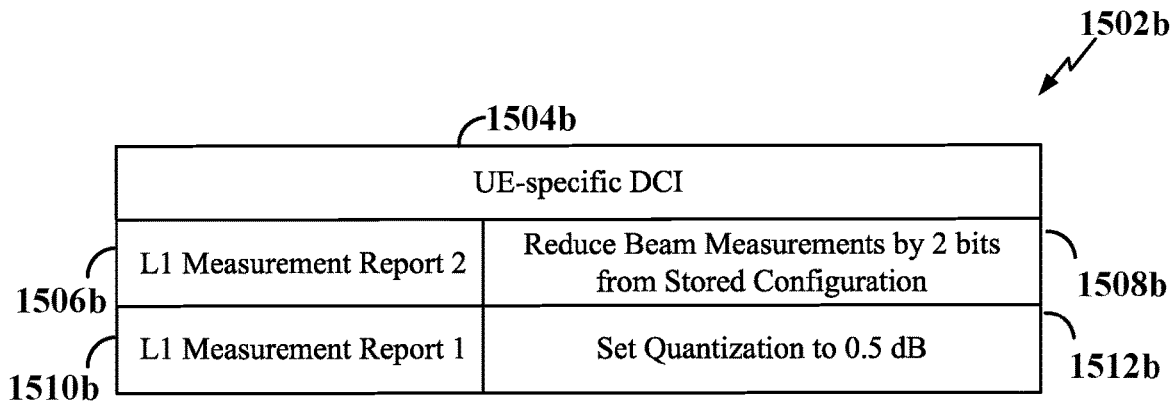
Figure 15C:
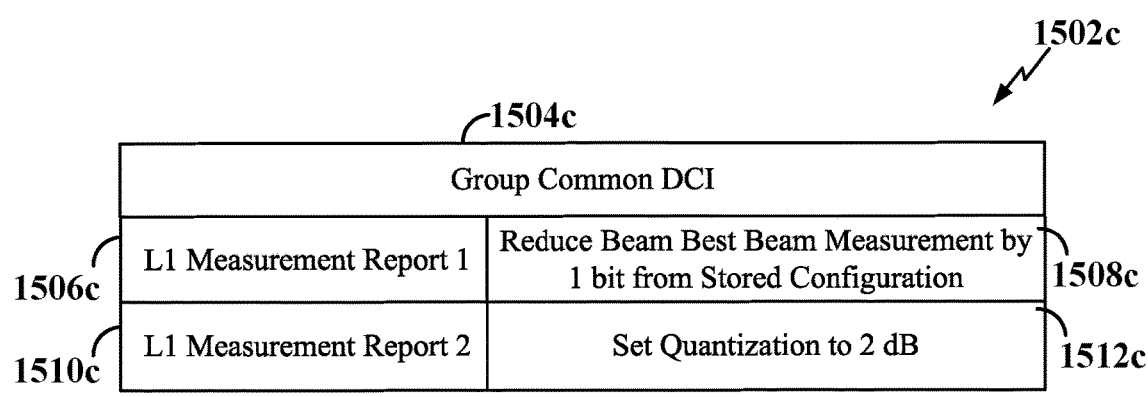

FIGS. 15A-C are conceptual diagrams illustrating examples indicating reduced measurement report resolutions according to some aspects. At FIG. 15A, an indication 1502a can be sent in a MAC CE 1504a. Indication 1502a instructs the UE to reduce reported beam measurements by two bits for a specified configuration 1508a in L1 measurement report 1 1506a. A specified configuration can be a configuration specified in a standard such as a 3GPP standard. Indication 1502a also instructs the UE to set the quantization level to 1 dB 1512a in L1 measurement report 1 1510a.

At FIG. 15B, an indication 1502b can be sent in a UE-specific DCI 1504b. A UE-specific DCI is a DCI for a specific UE. Indication 1502b instructs the UE to reduce reported beam measurements by two bits for a stored configuration 1508b in L1 measurement report 2 1506b. Indication 1502b also instructs the UE to set the quantization level to 0.5 dB 1512b in L1 measurement report 1 1510b.

At FIG. 15C, an indication 1502c can be sent in a group common DCI 1504c. A group common DCI is sent to many UEs. Indication 1502c instructs the UE to reduce reported beam measurements by one bit for a stored configuration 1508c in L1 measurement report 1 1506c. Indication 1502c also instructs the UE to set the quantization level to 2 dB 1512c in L1 measurement report 2 910c.

Figure 16:
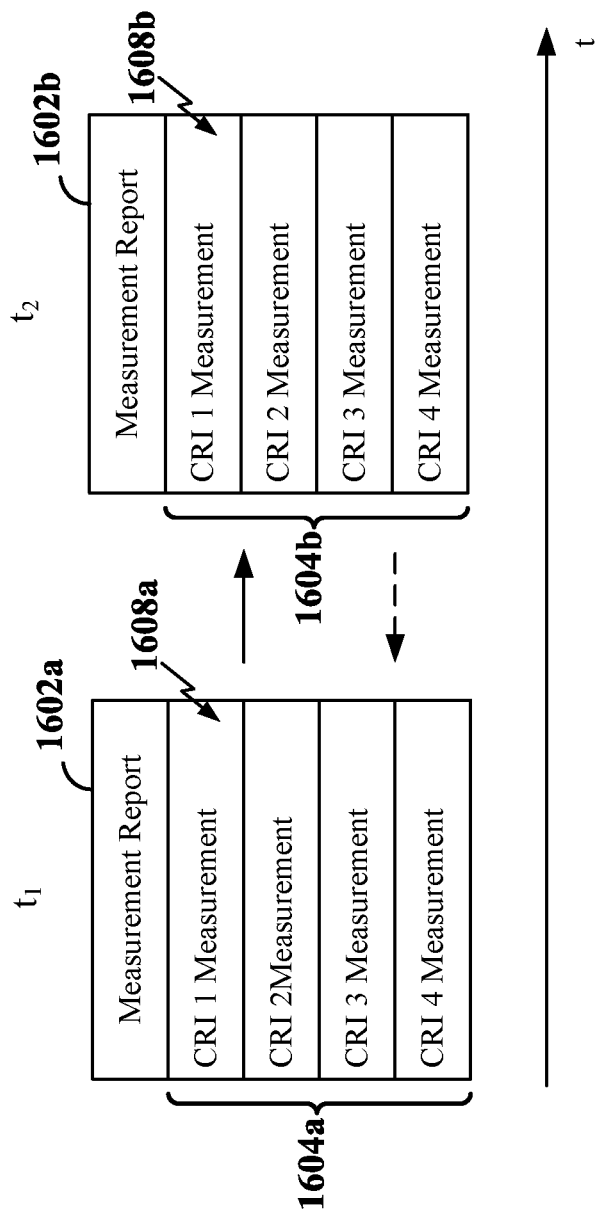
FIG. 16 is a diagram illustrating an example of measurement reports sent over time according to some aspects.

FIG. 16 is a diagram illustrating an example of measurement reports sent over time according to some aspects. In the example shown in FIG. 16, two L1 measurement reports 1602a and 1602b are illustrated. A first L1 measurement report 1602a may be sent at a first time ($t_1$) and a second L1 measurement report 1602b may be sent at a second time (t2). Thus, the first L1 measurement report 1602a may be considered a previous L1 measurement report in comparison to the second L1 measurement report 1602b.

Each L1 measurement report 1602a and 1602b can be a periodic L1 measurement report, a semi-persistent L1 measurement report, or a transient L1 measurement report. In addition, each L1 measurement report 1602a and 1602b may include respective beam measurements 1608a and 1608b associated with a respective CSI report setting 1604a and 1604b. In some examples, the CSI report settings 1604a and 1604b can be the same or different. It should be understood that multiple CSI report settings may be included in each L1 measurement report 1602a and 1602b.

In some examples, the beam measurements 1608a in the first L1 measurement report 1602a may be arranged in an order that may be configured based on the beam measurement values. For example, the first beam measurement in the first L1 measurement report 1602a may have the highest value, the second beam measurement in the first L1 measurement report 1602a may have the second highest value, and so on.

FIG. 17 is a diagram illustrating another example of a measurement report 1702 according to some aspects. A report setting may have configured the measurement report to have contents including four SINR beam measurements 1704 and four RSRP beam measurements 1706, each having a configuration as shown in configuration 802a of FIG. 8. As such, the measurement report resolution previously indicated for both the SINR measurement report section 1704 and for the RSRP measurement report section 1706 may have used seven bits for a first beam, four bits for a second beam, four bits for a third beam, and four bits for a fourth beam. An indication from the RAN may have indicated that a reduced measurement report resolution is to be used for the SINR section 1704 by, for example, explicitly indicating that five bits be used for a first beam, two bits for a second beam, two bits for a third beam, and two bits for a fourth beam. The same or a different indication from the RAN may have indicated that a reduced measurement report resolution is to be used for the RSRP section 1706 by indicating that the resolution for the first beam be reduced by 1 bit. The UE can be configured to reduce the reported resolution for each of the other beams based on the reduction in the number of bits to be used for the first beam measurement. As such, the RSRP section 1706 is illustrated as using six bits for a first beam, three bits for a second beam, three bits for a third beam, and three bits for a fourth beam.

Figure 18:
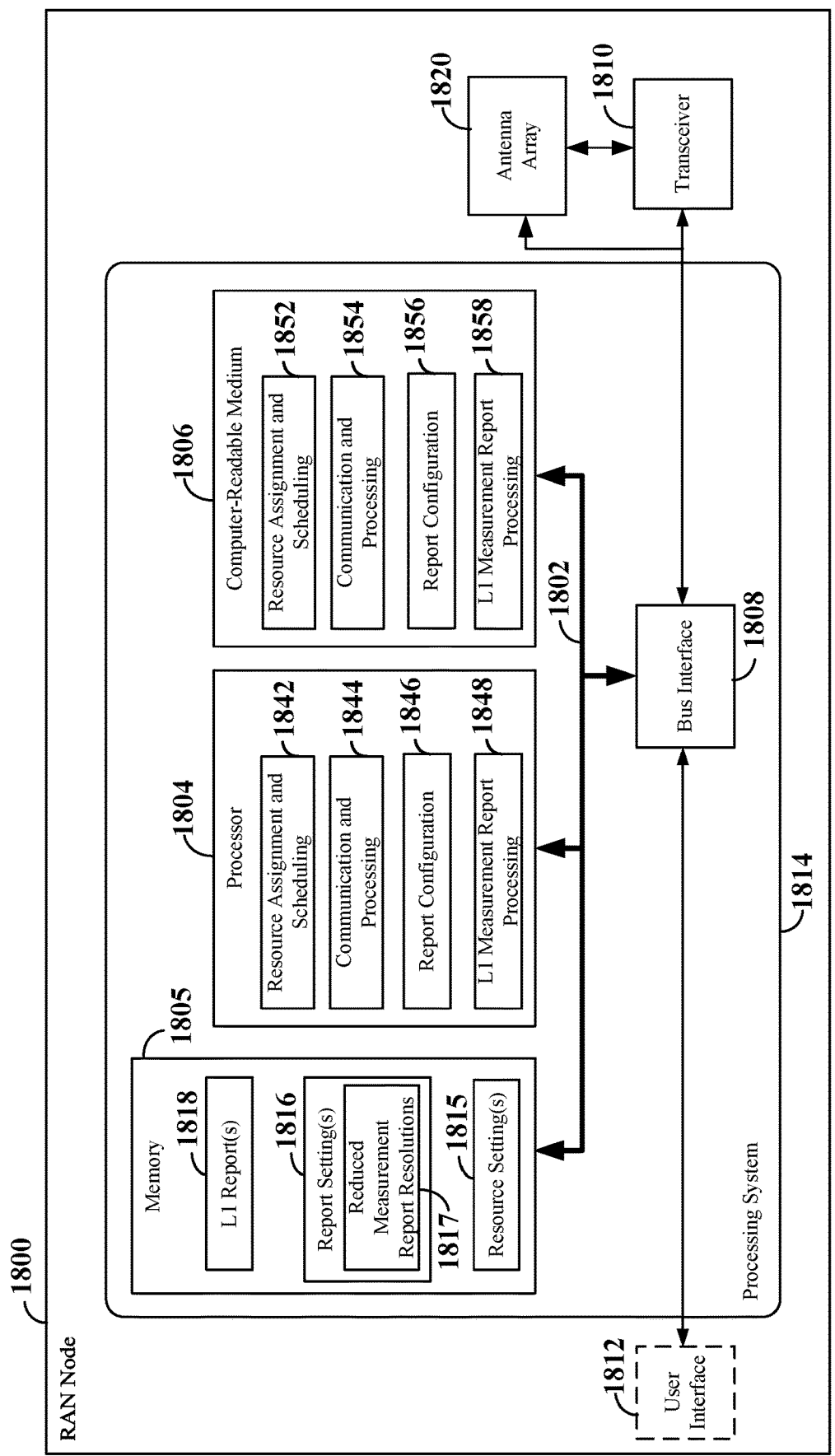
FIG. 18 is a block diagram illustrating an example of a hardware implementation for a RAN node employing a processing system according to some aspects.

FIG. 18 is a block diagram illustrating an example of hardware implementation for a RAN node 1800 employing a processing system 1814 according to some aspects. For example, the RAN node 1800 may be a base station (e.g., gNB) or other scheduling entity as illustrated in any one or more of FIGS. 1, 2, 4, 5, and/or 7.

The RAN node 1800 may be implemented with a processing system 1814 that includes one or more processors 1804. Examples of processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1800 may be configured to perform any one or more of the functions described herein. That is, the processor 1804, as utilized in a RAN node 1800, may be used to implement any one or more of the processes described below. The processor 1804 may in some instances be implemented via a baseband or modem chip and in other implementations, the processor 1804 may itself comprise a number of devices distinct and different from a baseband or modem chip (e.g., in such scenarios is may work in concert to achieve configurations discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1814 may be implemented with a bus architecture, represented generally by the bus 1802. The bus 1802 may include any number of interconnecting buses and bridges depending on the specific application of the processing system 1814 and the overall design constraints. The bus 1802 communicatively couples together various circuits including one or more processors (represented generally by the processor 1804), a memory 1805, and computer-readable media (represented generally by the computer-readable medium 1806). The bus 1802 may also link various other circuits such as timing sources, peripherals, voltage regulators, and power management circuits, which are well known in the art, and therefore, will not be described any further. A bus interface 1808 provides an interface between the bus 1802, a transceiver 1810, and an antenna array 1820. The antenna array 1820 may be a single panel antenna array or a multi-panel antenna array. The transceiver 1810 provides a means for communicating with various other apparatus over a transmission medium (e.g., air interface). A user interface 1812 (e.g., keypad, display, touchscreen, speaker, microphone, control knobs, etc.) may also be provided. Of course, such a user interface 1812 is optional, and may be omitted in some examples.

The processor 1804 is responsible for managing the bus 1802 and general processing, including the execution of software stored on the computer-readable medium 1806. The software, when executed by the processor 1804, causes the processing system 1814 to perform the various functions described below for any particular apparatus. The computer-readable medium 1806 and the memory 1805 may also be used for storing data that is manipulated by the processor 1804 when executing software.

One or more processors 1804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1806.

The computer-readable medium 1806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1806 may reside in the processing system 1814, external to the processing system 1814, or distributed across multiple entities including the processing system 1814. The computer-readable medium 1806 may be embodied in a computer program product. In some examples, the computer-readable medium 1806 may be part of the memory 1805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1804 may include circuitry configured for various functions. For example, the processor 1804 may include resource assignment and scheduling circuitry 1842, configured to generate, schedule, and modify a resource assignment or grant of time-frequency resources. For example, the resource assignment and scheduling circuitry 1842 may schedule time-frequency resources within a plurality of sub-bands or BWPs of one or more subframes or slots to carry user data traffic and/or control information to and/or from multiple UEs.

In various aspects of the present disclosure, the resource assignment and scheduling circuitry 1842 may be configured to schedule resources for the transmission of one or more RRC messages including one or more resource settings 1815 (e.g., CSI resource settings) and one or more report settings 1816 (e.g., CSI report settings) to one or more UEs for configuration of respective resource settings and respective report settings on each of the UEs. The resource settings 1815 and report settings 1816 may be maintained, for example, in memory 1805. The resource assignment and scheduling circuitry 1842 may further be configured to schedule resources for the transmission of an activation or deactivation message (e.g., via a MAC-CE) to a UE to activate or deactivate a semi-persistent report setting associated with PUCCH reporting. In addition, the resource assignment and scheduling circuitry 1842 may be configured to schedule resources for the transmission of a trigger message (e.g., via DCI) to a UE to trigger an aperiodic or semi-persistent report setting associated with PUSCH reporting. Furthermore, the resource assignment and scheduling circuitry 1842 may be configured to schedule resources for the transmission of report information associated with an aperiodic report setting (e.g., via the DCI containing the trigger message or a different message) to a UE to indicate a list and/or order of beam measurements to include in an aperiodic L1 measurement report.

The resource assignment and scheduling circuitry 1842 may further be configured to schedule resources for the periodic, aperiodic, and/or semi-persistent transmission of a plurality of reference signals on a plurality of beams. For example, the reference signals may include SSBs and/or RSs. The resource assignment and scheduling circuitry 1842 may further be configured to schedule resources for the transmission of one or more uplink L1 measurement reports 1818 on one or more PUCCH or PUSCH. The received uplink L1 measurement report(s) 1818 received from UEs may be stored, for example, in memory 1805. The resource assignment and scheduling circuitry 1842 may further be configured to execute resource assignment and scheduling software 1852 stored in the computer-readable medium 1806 to implement one or more of the functions described herein.

The processor 1804 may further include communication and processing circuitry 1844 configured to communicate with UEs over a carrier frequency. In some examples, the communication and processing circuitry 1844 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1844 may be configured to generate and transmit one or more RRC messages including one or more resource settings 1815 and one or more report settings 1816 to one or more UEs via the transceiver 1810. The communication and processing circuitry 1844 may further be configured to generate and transmit an activation or deactivation message (e.g., via a MAC-CE) to a UE via the transceiver 1810 to activate or deactivate a semi-persistent report setting associated with PUCCH reporting. In addition, the communication and processing circuitry 1844 may be configured to generate and transmit a trigger message (e.g., via DCI) to a UE via the transceiver 1810 to trigger an aperiodic or semi-persistent report setting associated with PUSCH reporting. Furthermore, the communication and processing circuitry 1844 may be configured to generate and transmit report information associated with an aperiodic report setting (e.g., via the DCI containing the trigger message or a different message) to a UE via the transceiver 1810 to indicate a list and/or order of beam measurements to include in an aperiodic L1 measurement report.

The communication and processing circuitry 1844 may further be configured to generate and transmit a plurality of reference signals (SSBs and/or -RSs) on a plurality of beams using the antenna array 1820 and transceiver 1810. The communication and processing circuitry 1844 may further be configured receive one or more uplink L1 measurement reports 1818 on one or more PUCCH or PUSCH from one or more UEs. The communication and processing circuitry 1844 may further be configured to execute communication and processing software 1854 stored in the computer-readable medium 1806 to implement one or more of the functions described herein.

The processor 1804 may further include report configuration circuitry 1846, configured to select at least one resource setting 1815 and at least one report setting 1816 for a UE. In some examples, the report configuration circuitry 1846 may further be configured to select a reduced measurement report resolution 1817 for one or more of the report settings 1816. In some examples, the report configuration circuitry 1846 may further be configured to enable reduced measurement report resolution for one or more of the report settings 1816 to allow the UE to use reduced measurement report resolution in L1 measurement reports associated with the report settings 1816. In some examples, the report configuration circuitry 1846 may further be configured to enable reduced measurement report resolution to be used per report setting (e.g., multiple information types may be sent in a single L1 measurement report) or per L1 measurement report (e.g., all report settings have the same information type in a single L1 measurement report).

In some examples, the report configuration circuitry 1846 may further be configured to select the report information for an aperiodic report setting or aperiodic L1 measurement report. For example, the report configuration circuitry 1846 may be configured to select a list and/or order of beam IDs to include in an L1 measurement report or within all L1 measurement reports associated with a particular report setting. In some examples, the list and/or order may be selected to be the same order as a last report setting utilized by the UE to generate an L1 measurement report or a last L1 measurement report of the same or a different report setting. The report configuration circuitry 1846 may further be configured to execute report configuration software 1856 stored in the computer-readable medium 1806 to implement one or more of the functions described herein.

The processor 1804 may further include L1 measurement report processing circuitry 1848, configured to receive and process an L1 measurement report 1818 received from a UE. The L1 measurement report 1818 can include beam measurement information including beam measurements (e.g., RSRP or SINR), each corresponding to a respective beam ID. The beam ID may be, for example, a CRI or SSBRI that identifies the particular beam (e.g., ports), frequency resource, and OFDM symbol on which the reference signal (e.g., SSB or CSI-RS) may be measured by the UE. The L1 measurement report 1818 may include up to four beam IDs and corresponding beam measurements as configured in the associated report setting 1816. In some examples, the L1 measurement report 1818 may use a previously indicated measurement report resolution or a reduced measurement report resolution.

Figure 19:
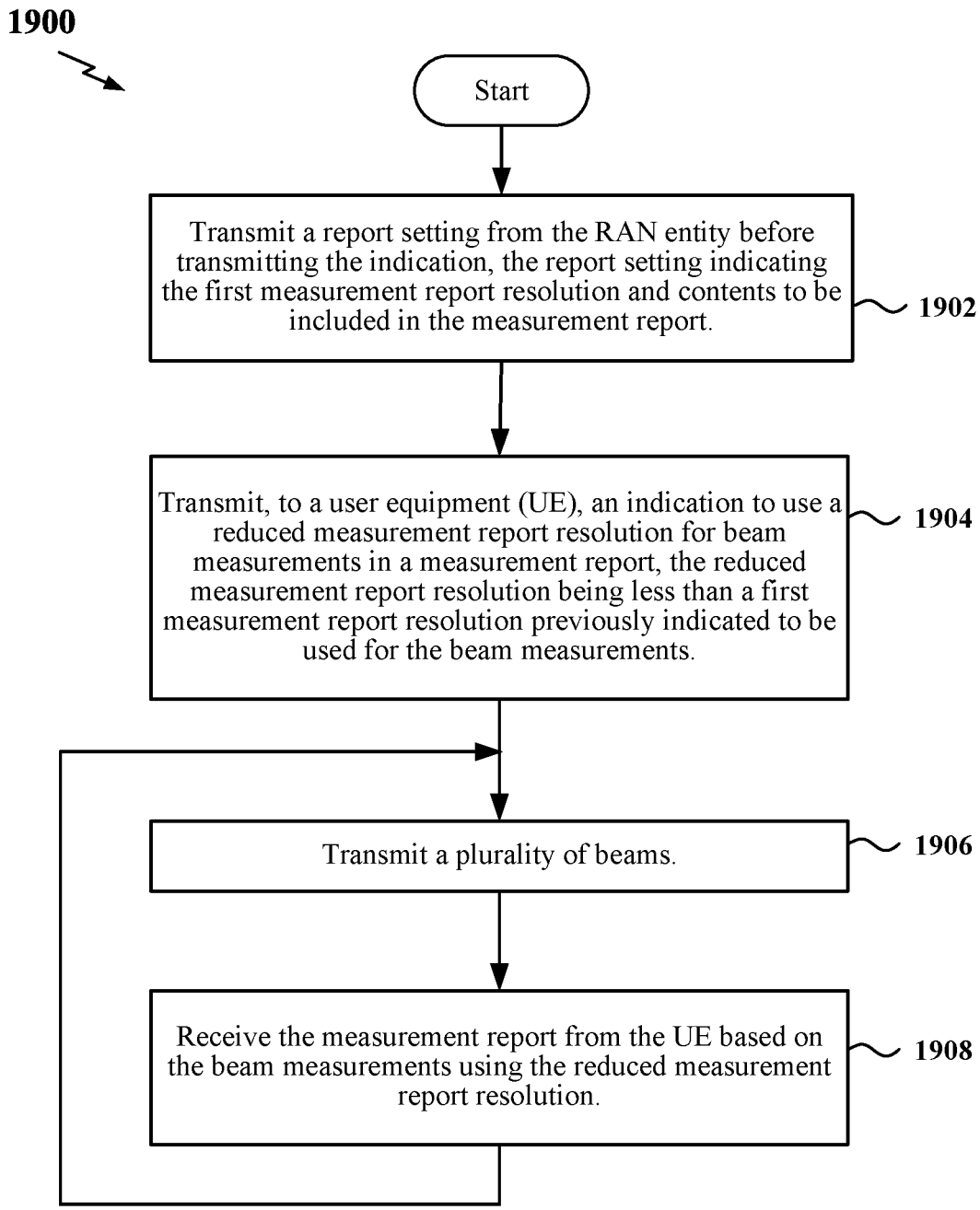
FIG. 19 is a flow chart of an exemplary method for a RAN node dynamically changing measurement report resolution according to some aspects.

FIG. 19 is a flow chart 1900 of a method for receiving an L1 measurement report using a reduced measurement report resolution. As described below, some or all illustrated features may be omitted in a particular implementation within the scope of the present disclosure, and some illustrated features may not be required for implementation of all configurations. In some examples, the method may be performed by the RAN node 1800, as described above and illustrated in FIG. 18, by a processor or processing system, or by any suitable means for carrying out the described functions.

At block 1902, the RAN node may transmit a report setting from the RAN entity before transmitting the indication, the report setting indicating a first measurement report resolution and contents to be included in the measurement report. The contents can be SINR or RSRP beam measurements. The first measurement report resolution can be the number of bits to use in reporting beam measurements. The report configuration circuitry 1846, together with the communication and processing circuitry 1844 and transceiver 1810, shown and described above in connection with FIG. 23, may transmit the at least one report setting.

At block 1904, the RAN node may transmit to a user equipment (UE), an indication to use a reduced measurement report resolution for beam measurements in a measurement report. The measurement report can be the measurement report configured via the report setting transmitted at block 1902 or can be any other previously set measurement report such as a measurement report specified by a standard that may be installed or stored during manufacture, software installation, or at some other time. After receiving the indication transmitted by the RAN at block 1904, the UE can use the reduced measurement report resolution when sending the measurement report to the RAN. As discussed above with respect to FIG. 14, the measurement report resolution can be set to use specific numbers of bits for each beam measurement. The reduced measurement report resolution can use fewer bits than the first measurement report resolution that was previously indicated for the reported beam measurements.

At block 1906, the RAN node transmits a plurality of beams. The RAN node can transmit reference signals, such as a SSB or CSI-RS, on each of a plurality of beams in a beam-sweeping manner. In some examples, the RAN node may transmit a reference signal on each of the plurality of beams. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams.

At block 1908, the RAN node receives a measurement report from the UE based on the beam measurements using the reduced measurement report resolution. An L1 measurement report can include beam measurement information including beam measurements, each corresponding to one of a plurality of beams utilized for communication with the UE. Each respective beam may be associated with a respective beam identifier. The respective beam identifiers may include a respective reference signal resource indicator associated with the reference signal and the respective beam. In some examples, the reference signal may include a SSB or CSI-RS. In some examples, the first beam measurement information includes a respective reference signal received power (RSRP) measurement for each of the plurality of beams or a respective signal-to-interference-plus-noise (SINR) measurement for each of the plurality of beams. The RAN node receives the measurement report which uses the reduced measurement report resolution indicated at block 1904.

Figure 20:
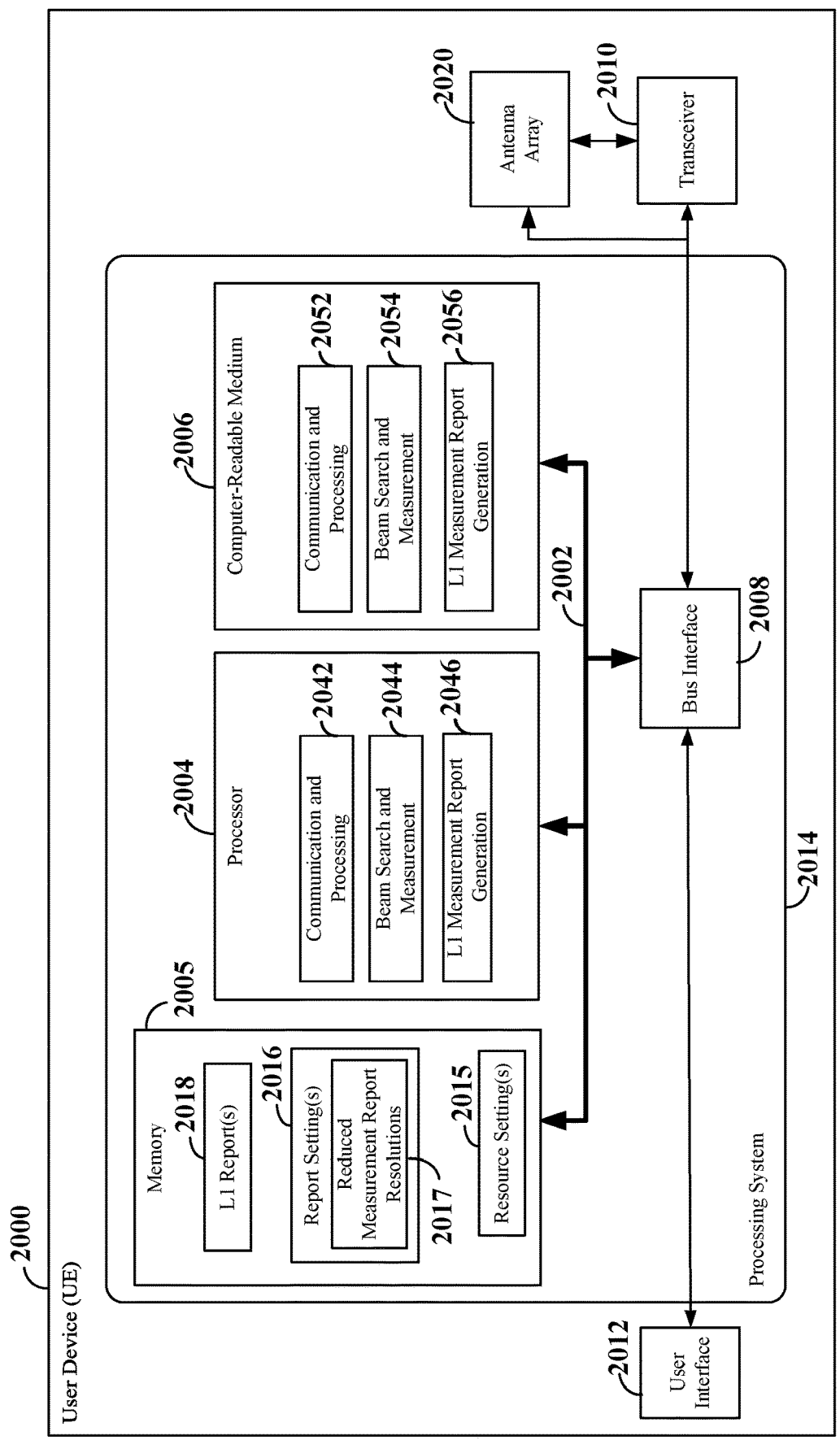
FIG. 20 is a block diagram illustrating an example of a hardware implementation for a UE employing a processing system according to some aspects.

FIG. 20 is a block diagram illustrating an example of a hardware implementation for a UE 2000 employing a processing system 2014 according to some aspects. For example, the UE 2000 may correspond to any of the UEs or scheduled entities shown and described above in reference to FIGS. 7, 8, 10, 11, and/or 13.

In accordance with various aspects of the disclosure, an element, or any portion of an element, or any combination of elements may be implemented with a processing system 2014 that includes one or more processors 2004. The processing system 2014 may be substantially the same as the processing system 1814 illustrated in FIG. 18, including a bus interface 2008, a bus 2002, memory 2005, a processor 2004, and a computer-readable medium 2006. Furthermore, the UE 2000 may include a user interface 2012, a transceiver 2010, and an antenna array 2020 substantially similar to those described above in FIG. 18. That is, the processor 2004, as utilized in a UE 2000, may be used to implement any one or more of the processes described below.

In some aspects of the disclosure, the processor 2004 may include circuitry configured for various functions. For example, the processor 2004 may include communication and processing circuitry 2042 configured to communicate with a RAN node (e.g., a base station, such as a gNB) via the transceiver 2010. The communication and processing circuitry 2042 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 2042 may be configured to exchange control information and data with the RAN node via one or more subframes, slots, and/or mini-slots.

In some examples, the communication and processing circuitry 2042 may be configured to receive one or more RRC messages including one or more resource settings 2015 (e.g., CSI resource settings) and one or more report settings 2016 (e.g., CSI report settings) from the serving RAN node via the transceiver 2010. The resource setting(s) 2015 and report setting(s) 2016 may be maintained, for example, in memory 2005 for subsequent use thereof.

The communication and processing circuitry 2042 may further be configured to receive an activation or deactivation message (e.g., via a MAC-CE) from the RAN node via the transceiver 2010 to activate or deactivate a semi-persistent report setting associated with PUCCH reporting. In addition, the communication and processing circuitry 2042 may be configured to receive a trigger message (e.g., via DCI) from the RAN node via the transceiver 2010 to trigger an aperiodic or semi-persistent report setting associated with PUSCH reporting. Furthermore, the communication and processing circuitry 2042 may be configured to receive report information associated with an aperiodic report setting (e.g., via the DCI containing the trigger message or a different message) from the RAN node via the transceiver 2010 that indicates a list and/or order of beam measurements to include in an aperiodic L1 measurement report.

The communication and processing circuitry 2042 may further be configured to receive a plurality of reference signals (SSBs and/or -RSs) on a plurality of beams using the antenna array 2020 and transceiver 2010. The communication and processing circuitry 2042 may further be configured to transmit an uplink L1 measurement report including beam measurement information (BMI) 2018 on a PUCCH or PUSCH to the RAN node. The communication and processing circuitry 2042 may further be configured to execute communication and processing software 2052 stored in the computer-readable medium 2006 to implement one or more of the functions described herein.

The processor 2004 may further include beam search and measurement circuitry 2044, configured to control the antenna array 2020 and transceiver 2010 to search for and identify a plurality of beams during a downlink beam sweep. The beam search and measurement circuitry 2044 may further be configured to receive a respective reference signal (e.g., SSB or CSI-RS) and measure a respective RSRP, SINR, or other suitable beam measurement of the respective reference signal on each of a set of the plurality of beams identified in a report setting 2016 and associated resource setting 2015. For example, the report setting 2016 may be associated with a resource setting 2015 including a configuration of one or more resource sets, each including a plurality of beam IDs indicating the set of beams and associated reference signal resources on which to obtain the beam measurements. The obtained beam measurements may be stored as the BMI 2018 within, for example, memory 2005 for use in generating an L1 measurement report including the BMI 2018. The beam search and measurement circuitry 2044 may further be configured to execute beam search and measurement software 2054 stored in the computer-readable medium 2006 to implement one or more of the functions described herein.

The processor 2004 may further include L1 measurement report generation circuitry 2046, configured to generate an L1 measurement report (e.g., a current L1 measurement report) based on the report setting 2016 and corresponding resource setting 2015 used to obtain the BMI 2018. The L1 measurement report generation circuitry 2046 may further operate together with the communication and processing circuitry 2042 and transceiver 2010 to transmit the current L1 measurement report to the RAN node. The current L1 measurement report can include the BMI 2018 including beam measurements (e.g., RSRP or SINR), each corresponding to a respective beam ID. The beam ID may be, for example, a CRI or SSBRI that identifies the particular beam (e.g., ports), frequency resource, and OFDM symbol on which the reference signal (e.g., SSB or CSI-RS) was measured. The current L1 measurement report may include up to four beam IDs and corresponding beam measurements as configured in the report setting 2016.

The processor 2004 may further include report configuration circuitry 2046, configured to select at least one resource setting 2015 and at least one report setting 2016 for a UE. In some examples, the report configuration circuitry 2046 may further be configured to select a reduced measurement report resolution 2017 for one or more of the report settings 2016. In some examples, the report configuration circuitry 2046 may further be configured to enable reduced measurement report resolution for one or more of the report settings 2016 to allow the UE to use reduced measurement report resolution in L1 measurement reports associated with the report settings 2016. In some examples, the report configuration circuitry 2046 may further be configured to enable reduced measurement report resolution to be used per report setting (e.g., multiple information types may be sent in a single L1 measurement report) or per L1 measurement report (e.g., all report settings have the same information type in a single L1 measurement report).

Figure 21:
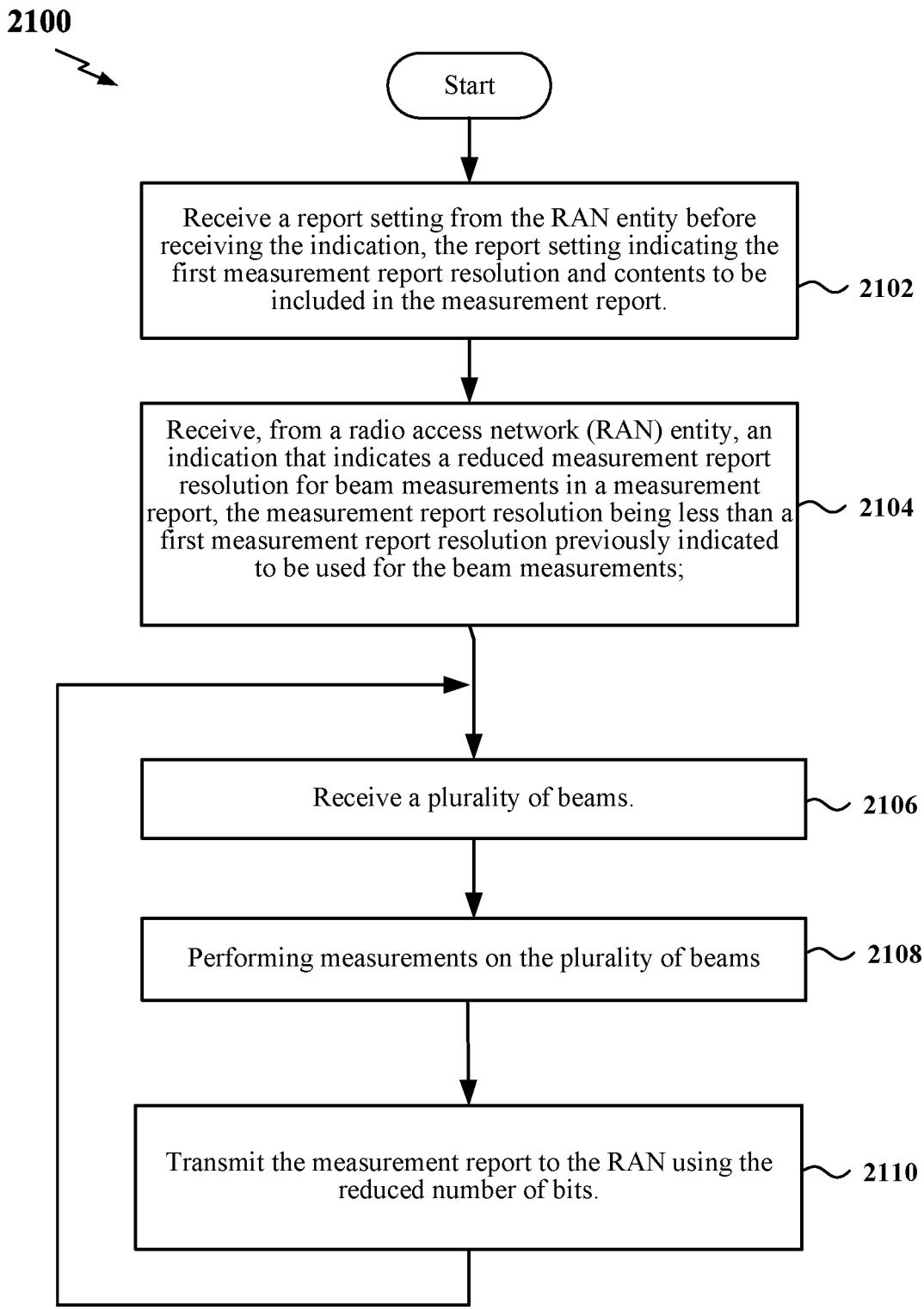
FIG. 21 is a flow chart of an exemplary method for a UE dynamically changing measurement report resolution according to some aspects.

FIG. 21 is a flow chart 2100 of an exemplary method for a UE dynamically changing measurement report resolution according to some aspects. As described below, some or all illustrated features may be omitted in a particular implementation within the scope of the present disclosure, and some illustrated features may not be required for implementation of all configurations. In some examples, the method may be performed by the UE 2000, as described above and illustrated in FIG. 20, by a processor or processing system, or by any suitable means for carrying out the described functions.

At block 2102, the UE may receive a report setting from the RAN entity before receiving the indication at block 2104, discussed below. The report setting can indicate a first measurement report resolution and contents to be included in a measurement report. The contents can be SINR or RSRP beam measurements. The first measurement report resolution can be the number of bits to use in reporting beam measurements. The report configuration circuitry 2046, together with the communication and processing circuitry 2044 and transceiver 2010, shown and described above in connection with FIG. 20, may transmit the at least one report setting.

At block 2104, the RAN node may transmit to a user equipment (UE), an indication to use a reduced measurement report resolution for beam measurements in a measurement report. The measurement report can be the measurement report configured via the report setting transmitted at step 2102 or can be any other previously set measurement report such as a measurement report specified by a standard that may be installed or stored during manufacture, software installation, or at some other time. After receiving the indication transmitted by the RAN at block 2104, the UE can use the reduced measurement report resolution when sending the measurement report to the RAN. As discussed above with respect to FIG. 8, the measurement report resolution can be set to use specific numbers of bits for each beam measurement. The reduced measurement report resolution can use fewer bits for one or more of the reported beam measurements.

At block 2106, the UE receives a plurality of beams transmitted by the RAN node. The RAN node can transmit reference signals, such as a SSB or CSI-RS, on each of a plurality of beams in a beam-sweeping manner. In some examples, the RAN node may transmit a reference signal on each of the plurality of beams. In some examples, SSBs may be transmitted on the wider beams, whereas CSI-RSs may be transmitted on the narrower beams. The UE may measure the reference signal received power (RSRP) or signal-to-interference-plus-noise ratio (SINR) on each of the beams.

At block 2108, the UE performs measurements on the plurality of beams. As discussed above, the processor 2004 may further include beam search and measurement circuitry 2044, configured to control the antenna array 2020 and transceiver 2010 to search for and identify a plurality of beams during a downlink beam sweep. The beam search and measurement circuitry 2044 may further be configured to receive a respective reference signal (e.g., SSB or CSI-RS) and measure a respective RSRP, SINR, or other suitable beam measurement of the respective reference signal on each of a set of the plurality of beams identified in a report setting 2016 and associated resource setting 2015.

At block 2110, the UE node transmits a measurement report to the RAN node based on the beam measurements using the reduced measurement report resolution. An L1 measurement report can include beam measurement information including beam measurements, each corresponding to one of a plurality of beams utilized for communication with the UE. Each respective beam may be associated with a respective beam identifier. The respective beam identifiers may include a respective reference signal resource indicator associated with the reference signal and the respective beam. In some examples, the reference signal may include a SSB or CSI-RS. In some examples, the first beam measurement information includes a respective reference signal received power (RSRP) measurement for each of the plurality of beams or a respective signal-to-interference-plus-noise (SINR) measurement for each of the plurality of beams. The UE transmits the measurement report using the reduced measurement report resolution indicated at block 2104, thereby reducing the payload of L1 measurement report.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-21 may be rearranged and/or combined into a single component, step, feature or function or embodied in several components, steps, or functions. Additional elements, components, steps, and/or functions may also be added without departing from features disclosed herein. The apparatus, devices, and/or components illustrated in the figures may be configured to perform one or more of the methods, features, or steps described herein. The algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) comprising:
a wireless transceiver; a memory; and
one or more processors communicatively coupled to the wireless transceiver and the memory, wherein the one or more processors are configured to execute instructions stored on the memory that cause the UE to:
receive, from a radio access network (RAN) entity, a report setting before receiving an indication, the report setting indicating a first measurement report resolution and beam measurements to be included in a measurement report;
receive, from the RAN entity, via the wireless transceiver, the indication indicating to the UE to use a reduced measurement report resolution for the beam measurements in the measurement report by indicating that each of one or more reported measurements of the beam measurements is to be reduced by a specific number of bits, the reduced measurement report resolution having reported beam measurements less than the first measurement report resolution previously indicated to be used for the beam measurements, the indication further indicating to the UE to set a quantization level in the measurement report;
receive, via the wireless transceiver, a plurality of beams;
perform measurements on the plurality of beams; and
transmit, to the RAN entity, via the wireless transceiver, the measurement report comprising the beam measurements using the reduced measurement report resolution multiplied by the quantization level.

2. The UE of claim 1, wherein the first measurement report resolution includes a number of bits to use in reporting beam measurements.

3. The UE of claim 1, wherein the beam measurements include a reference signal received power (RSRP) measurement.

4. The UE of claim 1, wherein the beam measurements include a signal to interference plus noise ratio (SINR) measurement.

5. The UE of claim 1, wherein the plurality of beams includes a first beam, a second beam, a third beam and a fourth beam, the first measurement report resolution having seven bits to report one or more measurements for the first beam, four bits to report one or more measurements for the second beam, four bits to report one or more measurements for the third beam, and four bits to report one or more measurements for the fourth beam.

6. The UE of claim 1, wherein the one or more processors are further configured to receive the indication in a media access control (MAC) control element (CE), user equipment (UE) specific downlink control information (DCI), or group common DCI.

7. The UE of claim 1, wherein the indication indicates a reduction in a number of bits to be used for a first beam measurement of the beam measurements, wherein the instructions, when executed by the one or more processors, further cause the UE to reduce the number of bits for each of one or more other measurements of the beam measurements based on the reduction in the number of bits to be used for the first beam measurement.

8. The UE of claim 1, wherein the beam measurements includes an absolute beam measurement of a first beam of the plurality of beams and a differential beam measurement of a second beam of the plurality of beams that is relative to the absolute beam measurement of the first beam.

9. The UE of claim 1, wherein the measurement report is a physical layer measurement report.

10. The UE of claim 1, wherein the one or more processors are further configured to:
receive, from the RAN entity, a second indication to resume using the first measurement report resolution for the beam measurements in a subsequent measurement report.

11. The UE of claim 1, wherein the one or more processors are further configured to:
receive, from the RAN entity, a second indication to further reduce the reduced measurement report resolution for the beam measurements in a subsequent measurement report.

12. A radio access network (RAN) node comprising:
a wireless transceiver; a memory; and
one or more processors communicatively coupled to the wireless transceiver and the memory, wherein the one or more processors are configured to execute instructions stored on the memory that cause the RAN node to:
transmit, to a user equipment (UE), a report setting before receiving an indication, the report setting indicating a first measurement report resolution and beam measurements to be included in the measurement report;
transmit, to the UE, via the wireless transceiver, the indication indicating to the UE to use a reduced measurement report resolution for the beam measurements in the measurement report by indicating that each of one or more reported measurements of the beam measurements is to be reduced by a specific number of bits, the reduced measurement report resolution having reported beam measurements that less than the first measurement report resolution previously indicated to be used for the beam measurements, the indication further indicating to the UE to set a quantization level in the measurement report;
transmit, via the wireless transceiver, a plurality of beams; and
receive, from the UE, via the wireless transceiver, the measurement report comprising the beam measurements using the reduced measurement report resolution multiplied by the quantization level.

13. A method, comprising:
receiving, from a radio access network (RAN) entity, a report setting before receiving an indication, the report setting indicating a first measurement report resolution and beam measurements to be included in a measurement report;
receiving, from the RAN entity, via a wireless transceiver, the indication indicating to a user equipment (UE) to use a reduced measurement report resolution for the beam measurements in the measurement report by indicating that each of one or more reported measurements of the beam measurements is to be reduced by a specific number of bits, the reduced measurement report resolution having reported beam measurements less than the first measurement report resolution previously indicated to be used for the beam measurements, the indication further indicating to the UE to set a quantization level in the measurement report;
receiving, via the wireless transceiver, a plurality of beams;
performing measurements on the plurality of beams; and
transmitting, to the RAN entity, via the wireless transceiver, the measurement report comprising the beam measurements using the reduced measurement report resolution multiplied by the quantization level.

14. The method of claim 13, wherein the first measurement report resolution includes a number of bits to use in reporting beam measurements.

15. The method of claim 13, wherein the beam measurements include a reference signal received power (RSRP) measurement.

16. The method of claim 13, wherein the beam measurements include a signal to interference plus noise ratio (SINR) measurement.

17. The method of claim 13, wherein the plurality of beams includes a first beam, a second beam, a third beam and a fourth beam, the first measurement report resolution having seven bits to report one or more measurements for the first beam, four bits to report one or more measurements for the second beam, four bits to report one or more measurements for the third beam, and four bits to report one or more measurements for the fourth beam.

18. The method of claim 13, further comprising:
receiving the indication in a media access control (MAC) control element (CE), user equipment (UE) specific downlink control information (DCI), or group common DCI.

19. The method of claim 13, wherein the indication indicates a reduction in a number of bits to be used for a first beam measurement of the beam measurements, further comprising: causing the UE to reduce the number of bits for each of one or more other measurements of the beam measurements based on the reduction in the number of bits to be used for the first beam measurement.

20. The method of claim 13, wherein the beam measurements includes an absolute beam measurement of a first beam of the plurality of beams and a differential beam measurement of a second beam of the plurality of beams that is relative to the absolute beam measurement of the first beam.

21. The method of claim 13, wherein the measurement report is a physical layer measurement report.

22. The method of claim 13, further comprising:
receiving, from the RAN entity, a second indication to resume using the first measurement report resolution for the beam measurements in a subsequent measurement report.

23. The method of claim 13, further comprising:
receiving, from the RAN entity, a second indication to further reduce the reduced measurement report resolution for the beam measurements in a subsequent measurement report.

* * * * *